United States Patent
Ohira et al.

(10) Patent No.: US 11,151,045 B2
(45) Date of Patent: Oct. 19, 2021

(54) DISTRIBUTED STORAGE SYSTEM, DATA MANAGEMENT METHOD, AND DATA MANAGEMENT PROGRAM

(71) Applicant: HITACHI, LTD., Tokyo (JP)

(72) Inventors: Yoshinori Ohira, Tokyo (JP); Masakuni Agetsuma, Tokyo (JP); Takeru Chiba, Tokyo (JP); Takahiro Yamamoto, Tokyo (JP); Hiroto Ebara, Tokyo (JP); Hideo Saito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 120 days.

(21) Appl. No.: 16/575,551

(22) Filed: Sep. 19, 2019

(65) Prior Publication Data

US 2020/0301842 A1 Sep. 24, 2020

(30) Foreign Application Priority Data

Mar. 19, 2019 (JP) .............................. JP2019-051736

(51) Int. Cl.
| | |
|---|---|
| *G06F 12/08* | (2016.01) |
| *G06F 12/02* | (2006.01) |
| *G06F 11/14* | (2006.01) |
| *G06F 3/06* | (2006.01) |
| *G06F 11/10* | (2006.01) |
| *G06F 12/0871* | (2016.01) |
| *G06F 12/0868* | (2016.01) |

(52) U.S. Cl.
CPC .......... *G06F 12/0871* (2013.01); *G06F 3/067* (2013.01); *G06F 3/0619* (2013.01); *G06F 3/0652* (2013.01); *G06F 3/0683* (2013.01); *G06F 11/1092* (2013.01); *G06F 11/1402* (2013.01); *G06F 12/0246* (2013.01); *G06F 12/0868* (2013.01)

(58) Field of Classification Search
CPC ............. G06F 12/0871; G06F 12/0246; G06F 12/0868; G06F 11/1402; G06F 3/0652; G06F 3/067; G06F 3/0683; G06F 3/0619; G06F 11/1092
See application file for complete search history.

(56) References Cited

U.S. PATENT DOCUMENTS

| | | |
|---|---|---|
| 10,185,624 B2 | 1/2019 | Akutsu et al. |
| 2002/0099908 A1 | 7/2002 | Yamamoto et al. |
| (Continued) | | |

FOREIGN PATENT DOCUMENTS

| | | |
|---|---|---|
| JP | 09-274544 A | 10/1997 |
| WO | 2016/052665 A1 | 4/2016 |

*Primary Examiner* — Masud K Khan
(74) *Attorney, Agent, or Firm* — Mattingly & Malur, PC

(57) ABSTRACT

Provided is a distributed storage system which can reduce a load on a network between storage apparatuses when an access request is received and improve responsiveness. In the distributed storage system, the storage device includes a data area and a cache area; a node becomes an owner node when receiving a transfer of charge of an LU from another node in a non-storage state where LU data is not stored in a data area; the processor of the owner node receives a read request for an LU that is in charge, obtains data of a target area based on data of the storage device of another node when the data of the target area is not stored in the data area or the cache area of the owner node, and transmits the data to a request source and stores it in a cache area.

13 Claims, 25 Drawing Sheets

(56) References Cited

U.S. PATENT DOCUMENTS

| | | | |
|---|---|---|---|
| 2013/0111153 A1* | 5/2013 | Lee | G06F 3/0635 |
| | | | 711/154 |
| 2019/0004970 A1* | 1/2019 | Pham | G06F 12/0891 |
| 2020/0004701 A1* | 1/2020 | Subbarao | G06F 3/0656 |

* cited by examiner

| LU# | PARTIAL AREA BEGINNING ADDRESS | NODE# | DEVICE# | IN-DEVICE BEGINNING ADDRESS |
|---|---|---|---|---|
| 000 | 0000 | 1 | 1 | 2000 |
| 000 | 1000 | 1 | 2 | 1000 |
| 001 | 0000 | 1 | 3 | 2000 |
| 001 | 1000 | 2 | 1 | 0000 |

411 412 413 414 415

DATA PAGE MANAGEMENT TABLE

| LU# | PARTIAL AREA BEGINNING ADDRESS | DEVICE# | IN-DEVICE BEGINNING ADDRESS | IN-CACHE PAGE OFFSET | LAST ACCESS TIME |
|---|---|---|---|---|---|
| 511 | 512 | 513 | 514 | 515 | 516 |
| 000 | 0000 | 1 | 2000 | 100 | 2222 |
| 000 | 1000 | 2 | 1000 | 0 | 2367 |
| 001 | 0000 | 3 | 2000 | 200 | 3012 |
| 001 | 1000 | 1 | 0000 | 100 | 6730 |

CACHE MANAGEMENT TABLE

FIG. 7

| LU# | PARTIAL AREA BEGINNING ADDRESS | IOPS | CACHE HIT RATE |
|---|---|---|---|
| 000 | 0000 | 100 | 50% |
| 000 | 1000 | 200 | 40% |
| 001 | 0000 | 300 | 20% |
| 001 | 1000 | 150 | 70% |

PERFORMANCE MONITOR MANAGEMENT TABLE

FIG. 11

| NODE# | LIFE-AND-DEATH STATUS | OWNER NODE LU# | NEW OWNER NODE LU# | EC NODE COMBINATION |
|---|---|---|---|---|
| 001 | Active | LU#1<br>LU#2 | — | D1:#001<br>D2: #002<br>D3: #003<br>P1: #004 |
| 002 | Failure | LU#3<br>LU#4 | — | D1: #002<br>D2: #003<br>D3: #004<br>P1: #005 |
| 007 | Active | LU#5<br>LU#6 | LU#3 | D1: #007<br>D2: #008<br>D3: #009<br>P1: #010 |
| 012 | Active | LU#7<br>LU#8 | LU#4 | D1: #011<br>D2: #012<br>D3: #013<br>P1: #014 |
| ... | ... | ... | ... | ... |

NODE INFORMATION MANAGEMENT TABLE

FIG. 21

| MIGRATION SOURCE LU (1711) | MIGRATION DESTINATION LU (1712) | MIGRATION COMPLETION ADDRESS (1713) |
|---|---|---|
| 000 | 002 | 0000 |
| 001 | 003 | 2222 |
| ... | ... | ... |

LU MIGRATION MANAGEMENT TABLE (1701)

DISTRIBUTED STORAGE SYSTEM, DATA MANAGEMENT METHOD, AND DATA MANAGEMENT PROGRAM

CROSS-REFERENCE TO RELATED APPLICATION

The present application claims priority from Japanese application JP 2019-051736, filed on Mar. 19, 2019, the contents of which is hereby incorporated by reference into this application.

BACKGROUND OF THE INVENTION

1. Field of the Invention

The present invention relates to a technique for managing data in a distributed storage system.

2. Description of the Related Art

A distributed storage system constituted by a plurality of general-purpose servers is known. In the distributed storage system, servers are connected using a general-purpose network such as TCP/IP. Since the general-purpose network has a low band and a high latency compared with an internal bus such as a PCI, it is preferable to control the amount of data transfer between servers to be as small as possible.

For example, WO2016/052665 (Patent Literature 1) discloses a technique for a distributed storage system to which distributed erasure coding is applied. The distributed storage system designs, in response to a data read out request from a host, a data storage destination so that data can be read out from a device in a server that received the request from the host, and is configured to reduce data transfer between servers accompanying the data read out.

On the other hand, there is a storage speeding up technique for speeding up a storage by storing data read out from a device in a large capacity cache and eliminating the device access at the time of referring to the same data. For example, JP-A-09-274544 (Patent Literature 2) discloses a technique for storing cache data in a device mounted in a storage and realizing a large capacity cache.

In consideration of a server failure or the like, it is always difficult to realize control of reading out data from a device in a server that has received a request from a host. For example, according to the distributed Erasure Coding technique described above, data necessary for data restoration has to be read out from another server at the time of a server failure. In addition, when the storage capacity of a certain server is insufficient, a part of the data has to be stored in another server, and the data has to be read out from the server. When a broadband network is constructed in advance so that the network would not become a bottleneck due to the data transfer, the cost of the system becomes high.

Also, a distributed storage system may become a bottleneck since the performance/capacity load may be concentrated on a specific server. In order to solve the problem, it is necessary to migrate data held by the server that has become the bottleneck to another server, which takes time to eliminate the bottleneck.

SUMMARY OF THE INVENTION

The invention has been made in view of the above circumstances, and an object thereof is to provide a technique for a distributed storage system capable of reducing a load on a network between storage apparatuses when an access request is received and improving responsiveness.

In order to achieve the above object, a distributed storage system according to one aspect includes a plurality of storage apparatuses as well as an in-charge storage apparatus and manages data distributed to a plurality of storage devices. The storage apparatus includes a processor unit, and the storage device includes a data area used to store data, and a cache area used to cache data. The in-charge storage apparatus is a storage apparatus in charge of an access to each logical unit that manages data. The storage apparatus becomes the in-charge storage apparatus in a non-storage state where data of the logical unit is not stored in the data area of the storage device that is accessible to itself when receiving a transfer of the charge of the logical unit from another storage apparatus. The processor unit of the in-charge storage apparatus receives a read request for a logical unit that is in charge itself, obtains data of a target area of the logical unit in the non-storage state based on data of the storage device of another storage apparatus, and transmits the obtained data of the target area of the logical unit to a request source of the read request, and stores the obtained data of the target area of the logical unit to a cache area of the storage device that is accessible to itself.

According to the invention, it is possible for a distributed storage system to reduce a load on a network between storage apparatuses when an access request is received and to improve access responsiveness.

BRIEF DESCRIPTION OF THE DRAWINGS

FIG. 5 is a configuration diagram of a data page management table according to the first embodiment;

FIG. 6 is a configuration diagram of a cache management table according to the first embodiment;

FIG. 7 is a configuration diagram of a performance monitor management table according to the first embodiment;

FIG. 11 is a configuration diagram of a node information management table according to the first embodiment;

FIG. 21 is a configuration diagram of an LU migration management table according to a third embodiment;

DESCRIPTION OF THE PREFERRED EMBODIMENTS

Embodiments will be described with reference to drawings. The embodiments described below do not limit the invention according to the claims, and all elements and combinations thereof described in the embodiments are not necessarily essential to the solution to the problem.

In the following description, information may be described with the expression "AAA table". Alternatively, information may be expressed with any data structure. That is, the "AAA table" may be referred to as "AAA information" to show that the information does not depend on the data structure.

In the following description, "storage unit" includes one or more memories or storage devices. At least one memory may be a volatile memory or a nonvolatile memory. The storage unit is mainly used in processing by a processor unit.

In the following description, "processor unit" includes one or more processors. At least one processor is typically a microprocessor such as a Central Processing Unit (CPU). Each of the one or more processors may be a single core or a multi core. A processor may include a hardware circuit that performs a part of or all of the processing.

In the following description, although the processing may be described using a "program" as a subject of operation, a processor may also be the subject of operation since the program is executed by a processor (for example, a CPU) to perform the determined processing appropriately using a storage resource (for example, a memory) and/or an interface unit (for example, a port). The processing described using the program as the subject may be performed by a device including a processor. In addition, a hardware circuit that performs a part or all of the processing performed by the processor may also be provided. A computer program may be installed on the device from a program source. The program source may be, for example, a program distribution server or a storage medium readable by a computer.

First Embodiment

Figure 1:
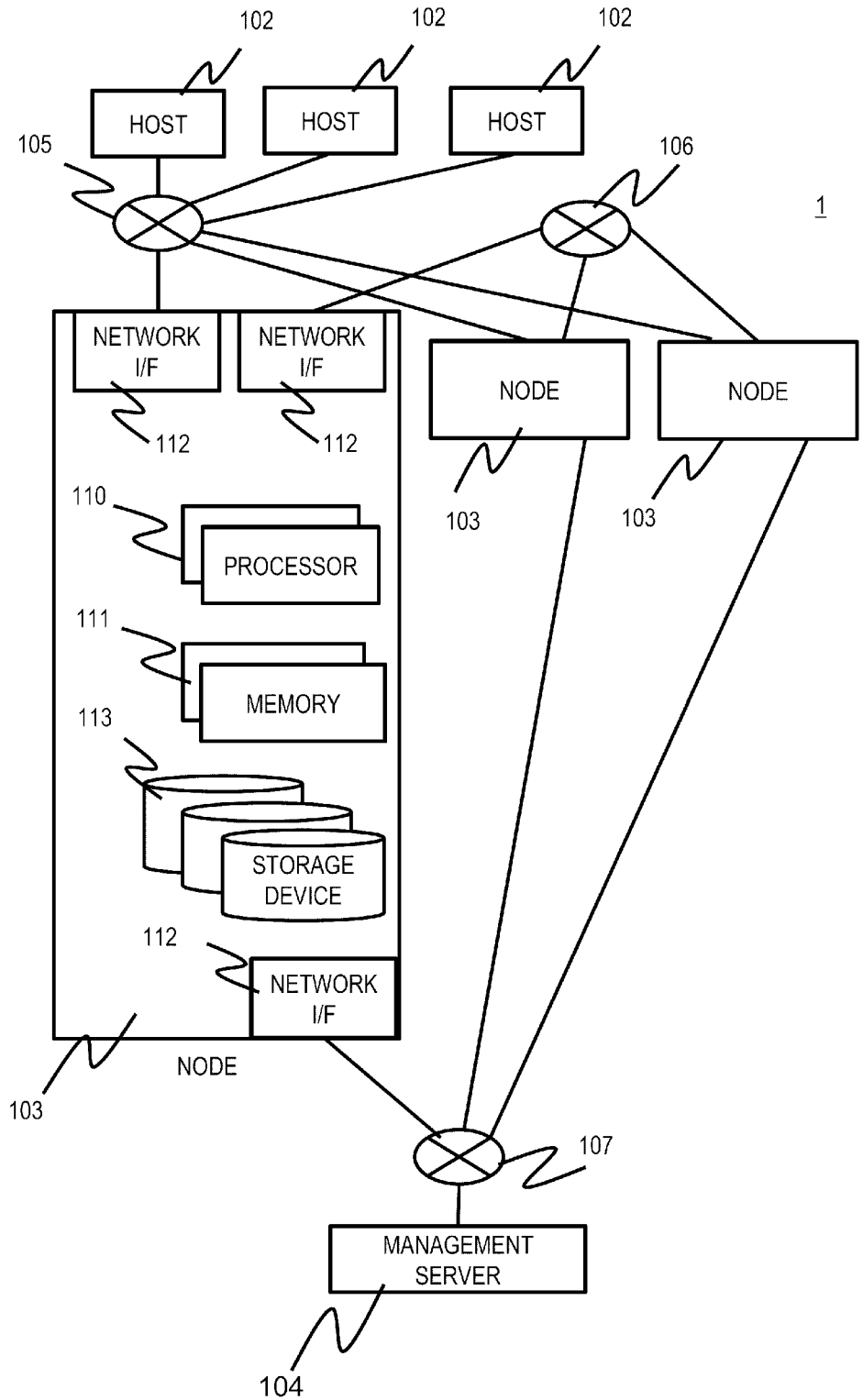
FIG. 1 is an overall configuration diagram of a distributed storage system according to a first embodiment.

FIG. 1 is an overall configuration diagram of a distributed storage system according to a first embodiment.

A distributed storage system 1 includes a plurality of host servers (hereinafter referred to as hosts) 102, a plurality of storage servers (an example of a storage apparatus, hereinafter referred to as a node) 103, and a management server 104. Each host 102 and each node 103 are connected to each other via a network 105. Each node 103 is connected via a network 106. Each node 103 and the management server 104 are connected to each other via a network 107. The networks 105, 106, and 107 may be a Local Area Network (LAN), a Wide Area Network (WAN) or the like, which do not depend on a specific topology or a specific communication protocol. For example, the networks 105, 106, and 107 may be a single network. With such a configuration, in the distributed storage system 1, data stored in each node 103 can be referred to and updated by each host 102, data can be transmitted and received between the nodes 103, and each node 103 can be controlled or monitored by the management server 104.

The host 102 executes an application, issues a write request (write request: an example of an access request) to the node 103 to store data in the node 103, or issues a read out request (read request: an example of the access request) to the node 103 to read out the data from the node 103, and executes various types of processing.

The management server 104 executes management processing of each node 103.

The node 103 executes processing for storing and managing data used by each host 102. The node 103 is constituted by, for example, a server device or a physical computer such as a Personal Computer (PC), and includes one or more processors 110, one or more memories 111, one or more network I/Fs 112, and one or more storage devices 113.

The network I/F 112 is, for example, a network interface such as a Network Interface Card (NIC) corresponding to Ethernet (registered trademark) or a Host Bus Adapter (HBA) corresponding to Fiber Channel. The network I/F 112 mediates communication with other devices (the host 102, other nodes 103, and the management server 104) via the networks 105, 106, and 107.

The processor 110 executes various types of processing in accordance with programs stored in the memory 111 and/or the storage device 113.

The memory 111 is, for example, a RAM, and stores programs to be executed by the processor 110 and necessary information. The memory 111 may be a volatile memory or a nonvolatile memory.

The storage device 113 is a Hard Disk Drive (HDD), a Solid State Drive (SSD) or the like, and stores programs executed by the processor 110, data used by the processor 110, data used by the host 102, and the like.

The processor 110, the memory 111, the network I/F 112, and the storage device 113 in the node 103 may be virtual hardware using a server virtualization technique. That is, the node 103 may be a Virtual Machine (VM).

In the distributed storage system 1, the host 102 and the node 103 may be arranged on the same physical computer. In this case, for example, in the same physical computer, the host 102 and the node 103 may be operated on the VM separately.

Figure 2:
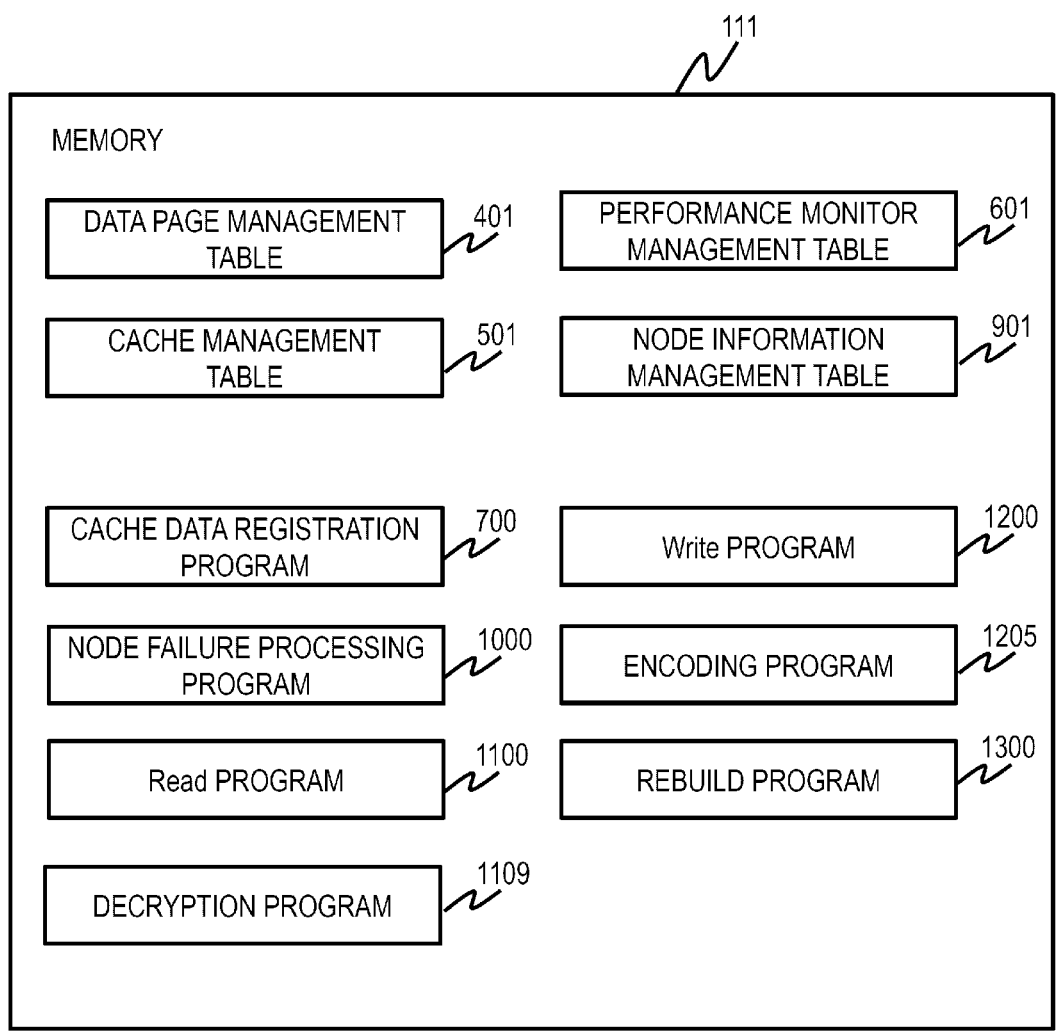
FIG. 2 is a configuration diagram of a memory according to the first embodiment.

FIG. 2 is a configuration diagram of a memory according to the first embodiment.

The memory 111 stores a data page management table 401 a cache management table 501, a performance monitor management table 601, a node information management table 901, a cache data registration program 700, a node failure processing program 1000, a Read program 1100, a decryption program 1109, a Write program 1200, an encoding program 1205, and a rebuild program 1300. Details of the above tables and processing realized by executing each program will be described below.

Figure 3:
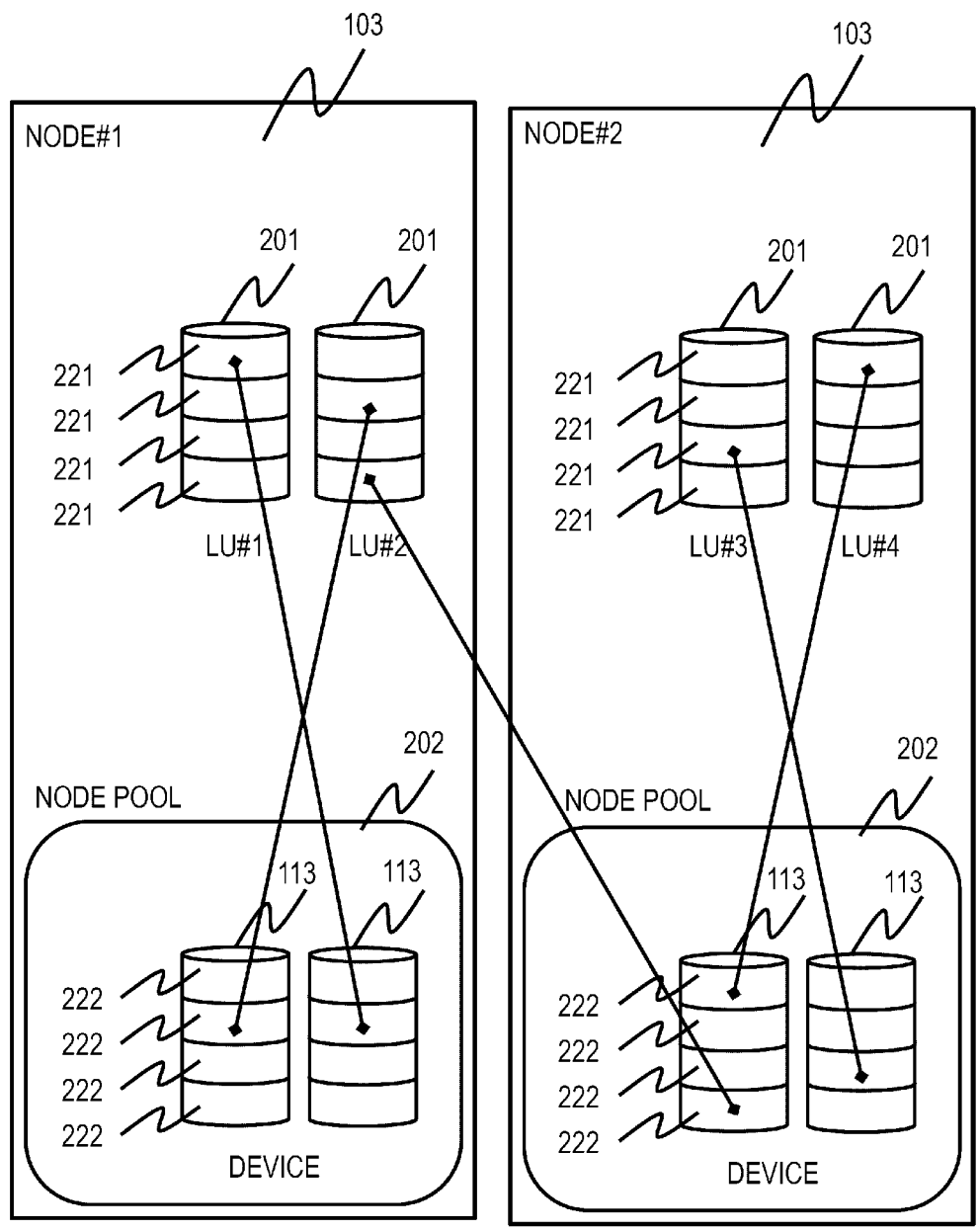
FIG. 3 is a logical configuration diagram of data in the distributed storage system according to the first embodiment.

FIG. 3 is a logical configuration diagram of data in the distributed storage system according to the first embodiment.

A plurality of Logical Units (LUs) 201 can be defined in each node 103. The host 102 can perform block I/O (I/O in units of blocks) for the LU 201. The node 103 can receive the block I/O from the host 102. Each LU 201 can be referred to and updated by the host 102 connected to any of the nodes 103.

Generally, when referring to and updating the LU 201 from a plurality of nodes 103, a certain exclusive procedure is required between the nodes 103 to maintain data consistency. In the present embodiment, a node in charge of the I/O processing (owner node: an example of an in-charge storage apparatus) is defined in advance for each LU 201. The node 103 that has received an I/O request from the host 102 transfers the I/O processing request to the owner node of the LU 201 that is an I/O target specified in the I/O request, and maintains data consistency by performing the I/O processing of the LU in which only the owner node is an I/O target. In the example shown in FIG. 3, the owner node of LU #1 and LU #2 is node #1, and the owner node of LU #3 to LU #4 is node #2. Both the node #1 and the node #2 are capable of receiving block I/O of the LU #1 to the LU #4.

The data exclusive procedure in the distributed storage system 1 is not limited to the above. For example, a lock mechanism between the nodes 103 may be provided for each LU 201 and the node that has received the I/O may acquire the lock of the LU 201 that is an I/O target and then perform I/O processing. In the present embodiment, although the owner node is defined in units of LUs 201, the invention is not limited thereto and the owner node may be predefined for a partial area 221 of each LU 201.

Although the present embodiment adopts the distributed storage system 1 capable of processing the block I/O, a distributed storage system capable of processing non-block I/O such as a file or an object may also be used. In this case, for example, by preparing a program that converts file I/O or object I/O to the block I/O, the same effect as that of the present embodiment can be obtained.

Each storage device 113 in each node 103 is divided into fixed size areas (hereinafter referred to as pages) 222 by a general Thin Provisioning technique, and is managed as a pool (hereinafter referred to as a node pool) 202 for each node 103. According to the Thin Provisioning technique, in accordance with a write request from the host 102, the pages 222 are dynamically associated with the partial areas 221 of each LU 201 requested, and data that is the write target is written to the associated pages 222.

The pages 222 associated with each LU 201 are basically obtained from the node pool 202 of the owner node 103 of the LU 201. However, when there is no free page in the node pool 202, the page 222 of the node pool 202 of another node 103 may be associated as necessary. In other words, the pages 222 of a plurality of node pools 202 may be associated with the LU 201. Further, for the page 222 already associated with the LU 201, it is possible to change a page to be associated with the pages 222 of another node pool 202. Specifically, this can be easily realized by obtaining a new page 222 from the node pool 202 that is a change destination, copying data of the associated page to the page 222, and changing the associated page for the LU to the page 222 that is the copy destination.

Figure 4:
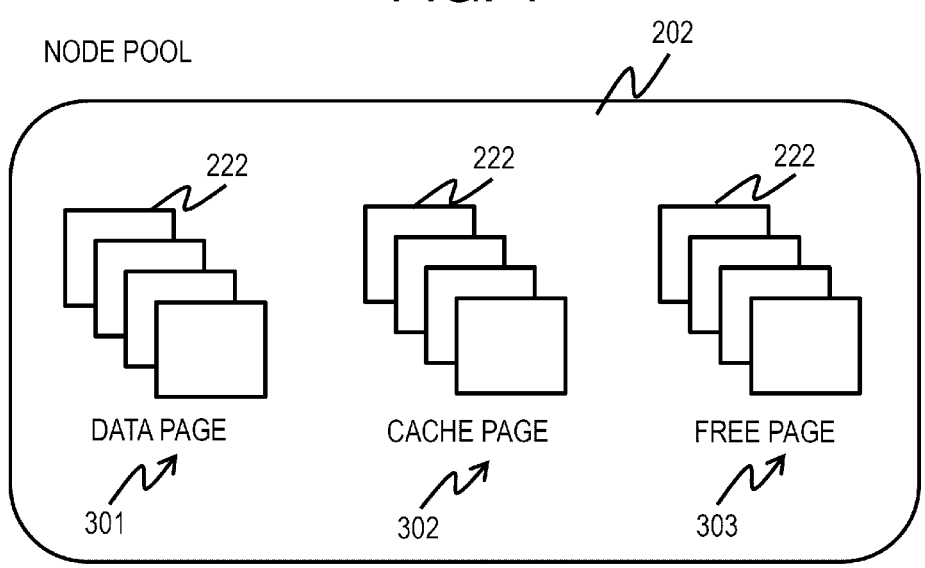
FIG. 4 is a configuration diagram of a node pool according to the first embodiment.

FIG. 4 is a configuration diagram of a node pool according to the first embodiment.

The area managed by the node pool 202 is classified into three types and managed, which are a data storage page (data page: a part of a data area) 301 for permanently storing data, a cache storage page (cache page: a part of a cache area) 302, and a data non-storage free page 303. All of data written from the host 102 is eventually stored in any of the data pages 301. On the other hand, for the purpose of improving the I/O performance, a part of the data is stored as cache data in the cache page 302. The balance in capacity between the cache area constituted by the cache page 302 and the data area constituted by the data page 301 in the node pool 202 can be changed as appropriate. How to change the capacity between the cache area and the data area will be described below.

FIG. 5 is a configuration diagram of a data page management table according to the first embodiment.

A data page management table 401 is held in each node 103 and manages association information between the data page 301 and the partial area 221 of an LU which becomes the owner node itself (that is, an LU that is in charge of itself). The data page management table 401 stores an entry corresponding to each partial area of each LU. The entry of the data page management table 401 includes fields of an LU number (LU #) 411, a partial area beginning address 412, a node number (node #) 413, a device number (device #) 414, and an in-device beginning address 415.

The LU number 411 stores the number of the LU corresponding to the entry. The partial area beginning address 412 stores a beginning address of the partial area corresponding to the entry. The node number 413 stores the number of the node 103 in which the data page to be associated with the partial area corresponding to the entry is stored. The device number 414 stores the number of the storage device 113 in which the data page to be associated with the partial area corresponding to the entry is stored. The in-device beginning address 415 stores a beginning address in the storage device 113 in which the data page to be associated with the partial area corresponding to the entry is stored. When the data page is not associated with the partial area of the LU corresponding to the entry, that is, when the data is not stored in the corresponding partial area, the information is not stored in the node number 413, the device number 414, or the in-device beginning address 415.

FIG. 6 is a configuration diagram of a cache management table according to the first embodiment.

The cache management table 501 is held in each node 103 and manages association information between each partial area of each LU of which the node itself is an owner node and a storage destination of cache data. In the present embodiment, the cache data is managed at a fixed size smaller than the cache page 302. That is, a plurality of pieces of cache data are stored for each cache page 302. Unlike the data page 301, the cache page 302 is obtained only from its own node pool 202. Although the cache data is stored only in the storage device 113 in the present embodiment, a part of the cache data may be stored in the memory 111.

The cache management table 501 stores an entry corresponding to each partial area of each LU. The entry of the cache management table 501 includes fields of an LU number 511, a partial area beginning address 512, a device number 513, an in-device beginning address 514, an in-cache page offset 515, and last access time 516.

The LU number 511 stores the number of the LU corresponding to the entry. The partial area beginning address 512 stores a beginning address of the partial area corresponding to the entry. The device number 513 stores the number of the storage device 113 in which the cache page to be associated with the partial area corresponding to the entry is stored. The in-device beginning address 514 stores a beginning address in the storage device 113 of the cache page associated with the partial area corresponding to the entry. The in-cache page offset 515 stores an offset in the cache page in which the partial area corresponding to the entry is stored. The last access time 516 stores information on the last access time for the partial area corresponding to the entry. In the example of FIG. 6, although the information of the last access time is count from a predetermined time point, the information of the last access time may be information such as year, month, day, hour, minute, and second. Here, for managing cache data, a cache replacement algorithm is necessary for determining data to be replaced at the time of registering new cache data. In the present embodiment, it is assumed that Least Recent Use (LRU) is used for this algorithm, and the field of the last access time 516 is provided in the entry. Note that, other algorithms may be used instead of the cache replacement algorithm.

FIG. 7 is a configuration diagram of a performance monitor management table according to the first embodiment.

A performance monitor management table 601 is held in each node 103 and manages the I/O status from the host 102 for each partial area of each LU of which the node itself is an owner node. The performance monitor management table 601 stores an entry for each partial area of each LU. The entry of the performance monitor part table 601 includes fields of an LU number 611, a partial area beginning address 612, an IOPS 613, and a cache hit rate 614.

The LU number 611 stores the number of the LU corresponding to the entry. The partial area beginning address 612 stores a beginning address of the partial area corresponding to the entry. The IOPS 613 stores I/O per Second (IOPS) for the partial area corresponding to the entry. The cache hit rate 614 stores a cache hit rate for the partial area corresponding to the entry. The method for obtaining the IOPS and the cache hit rate is known and thus the detailed description is omitted. In the present embodiment, the IOPS and the cache hit rate are stored in the entry. However, the invention is not limited thereto, and other information may be stored as long as the information indicates the I/O status of the partial area corresponding to the entry.

Next, the cache data registration processing will be described.

Figure 8:
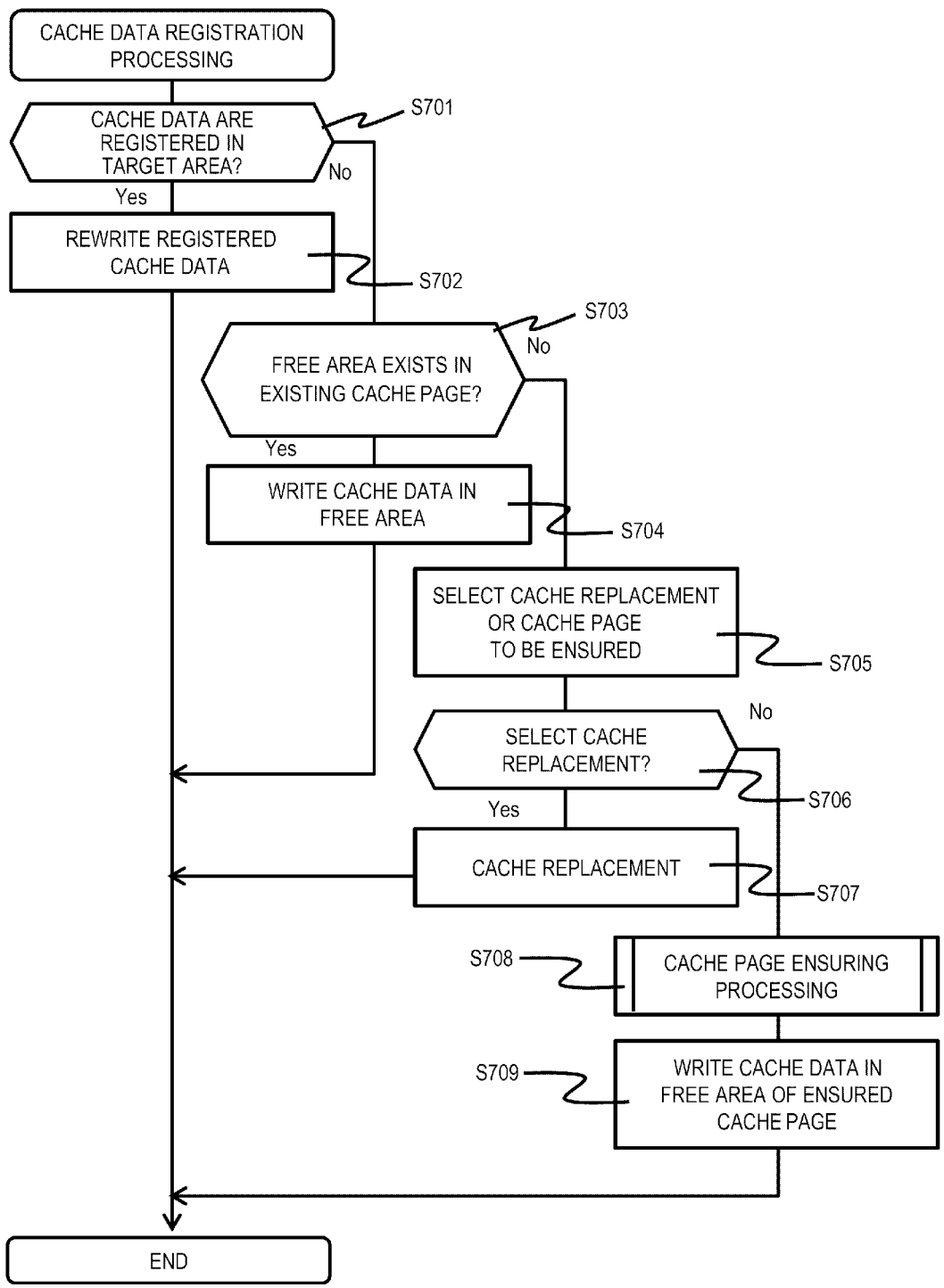
FIG. 8 is a flowchart of cache data registration processing according to the first embodiment.

FIG. 8 is a flowchart of cache data registration processing according to the first embodiment.

The cache data registration processing is realized by executing the cache data registration program 700 by the processor 110 of the node 103 and registering the data of the partial area of the designated LU to be managed as cache data. The cache data registration processing is executed, for example, when there is a request to register data targeted by a read request or a write request as cache data.

The cache data registration program 700 (specifically, the processor 110 that executes the cache data registration program 700) determines whether or not cache data has already been registered in the partial area of the designated LU (S701). Here, whether or not the cache data is registered in the partial area of the LU can be specified by referring to the cache management table 501, and by checking whether or not a value is set in the device number 513, the in-device beginning address 514, and the in-cache page offset 515 in the entry corresponding to the partial area of the designated LU.

As a result, when the cache data is already registered in the partial area of the designated LU (S701: Yes), the cache data registration program 700 rewrites the registered cache data into the designated cache target data (cache target data) (S702) and ends the processing.

On the other hand, when the cache data is not registered in the partial area of the designated LU (S701: No), the cache data registration program 700 determines whether or not a free area that can store the cache target data exists in the existing cache page (S703). Here, for example, a table that manages the free area of the cache page may be prepared in advance and be referred to determine whether or not the free area exists in the cache page.

As a result, when the free area that can store the cache target data exists in the existing cache page (S703: Yes), the cache data registration program 700 writes the cache target data in the free area, stores values corresponding to the device number 513, the in-device beginning address 514, the in-cache page offset 515, and the last access time 516 of the entry corresponding to the partial area of the designated LU in the cache management table 501 (S704), and ends the processing.

On the other hand, when the free area that can store the cache target data does not exist in the existing cache page (S703: NO), the cache data registration program 700 determines whether to execute cache replacement to ensure a cache page or to obtain and ensure a new cache page (S705). Here, the determination for whether to execute cache replacement to ensure a cache page or to obtain and ensure a new cache page can be made based on a value of the cache hit rate 614 of the entry of the designated LU in the performance monitor management table 601 or the like. In this case, when the cache hit rate is smaller than a predetermined value, it is considered that chances of improving the cache hit rate are small even if the cache data is increased, so that it may be determined to ensure the cache page by replacing the cache page. On the other hand, when the cache hit rate is larger than the predetermined value, the cache hit rate may be increased by increasing the cache data, so that it may be determined to obtain and ensure a new cache page.

When determining whether or not to select the cache replacement (S706) and the cache replacement is selected (S706: Yes), the cache data registration program 700 executes the cache replacement (S707). Specifically, the cache data registration program 700 releases association information (the device number 513, the in-device beginning address 514, and the in-cache page offset 515 of the entry) on the partial area in which the time of the last access time 516 in the cache management table 501 is the earliest, rewrites the data in an area (cache page) indicated by the association information into the cache target data, and stores the association information in an entry corresponding to the partial area of the designated LU in the cache management table 501.

On the other hand, when the cache replacement is not selected, that is, when ensuring a new cache page is selected (S706: No), a new cache page is ensured (S708) by executing cache page ensuring processing (see FIG. 9). The cache target data is written in the free area of the cache page, and the association information corresponding to the entry corresponding to the partial area of the designated LU of the cache management table 501 is stored (S709), and the processing is ended.

Next, the cache page ensuring processing (S708 in FIG. 8) will be described in detail.

Figure 9:
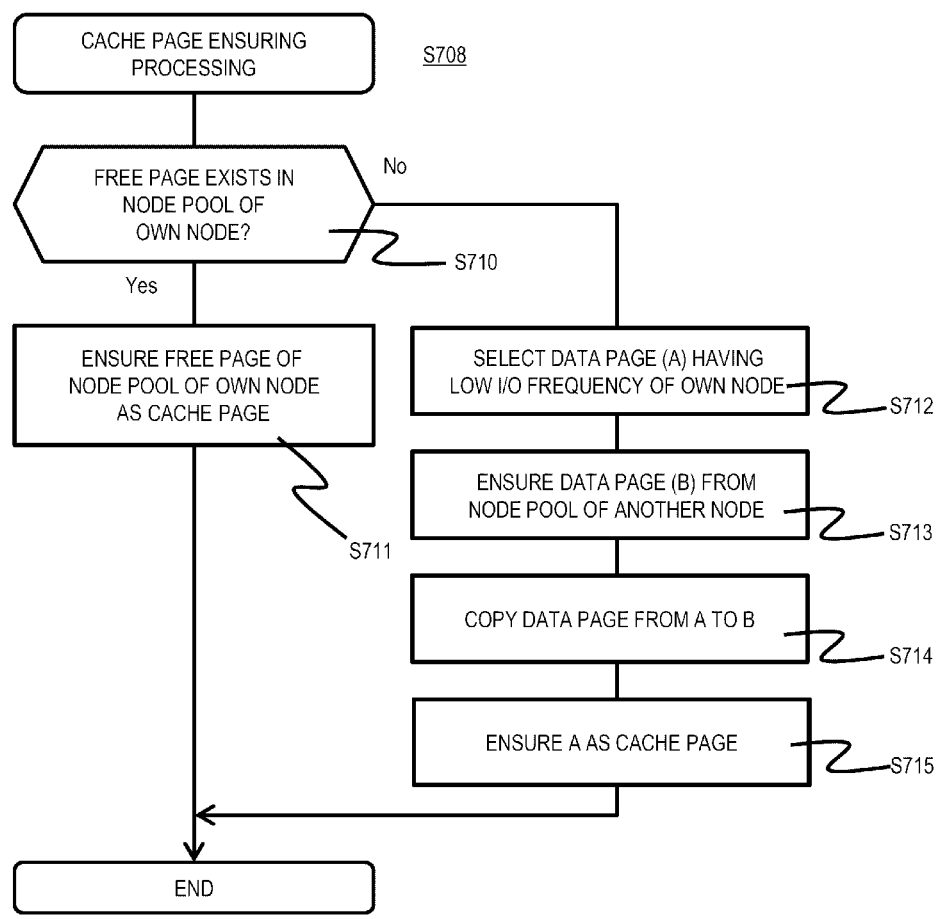
FIG. 9 is a flowchart of cache page ensuring processing according to the first embodiment.

FIG. 9 is a flowchart of cache page ensuring processing according to the first embodiment.

In the cache page ensuring processing, the cache data registration program 700 determines whether or not a free page exists in the node pool 202 of itself (the node 103 to which the node pool 202 belongs) (S710). When the empty page exists (S710: Yes), the free page is ensured as a cache page (S711), and the processing is returned.

On the other hand, when the free page does not exist (S710: No), the cache data registration program 700 executes processing of converting the data page into a cache page (S712 to S715). Specifically, the cache data registration program 700 refers to the performance monitor management table 601 and selects a page (page A) having a low I/O frequency (IOPS) of the own node 103 (S712), selects one of other nodes 103 in which the free page exists in the node pool 202 to ensure a data page (page B) from the free page of the node pool 202 of the node 103 (S713), and reads out data from the page A and copies the data into the ensured page B (S714). Next, the cache data registration program 700 ensures the page A as a cache page (S715), and returns the processing.

Accordingly, it is possible to appropriately ensure a cache page to store the cache target data. For example, when there is no free page in the node 103, the data of the data page may be moved to other nodes 103 to increase the capacity of the cache page. Therefore, it is possible to improve the access performance by the cache.

Next, a distributed Erasure Coding (hereinafter referred to as distributed EC) method in the distributed storage system 1 will be described.

Figure 10:
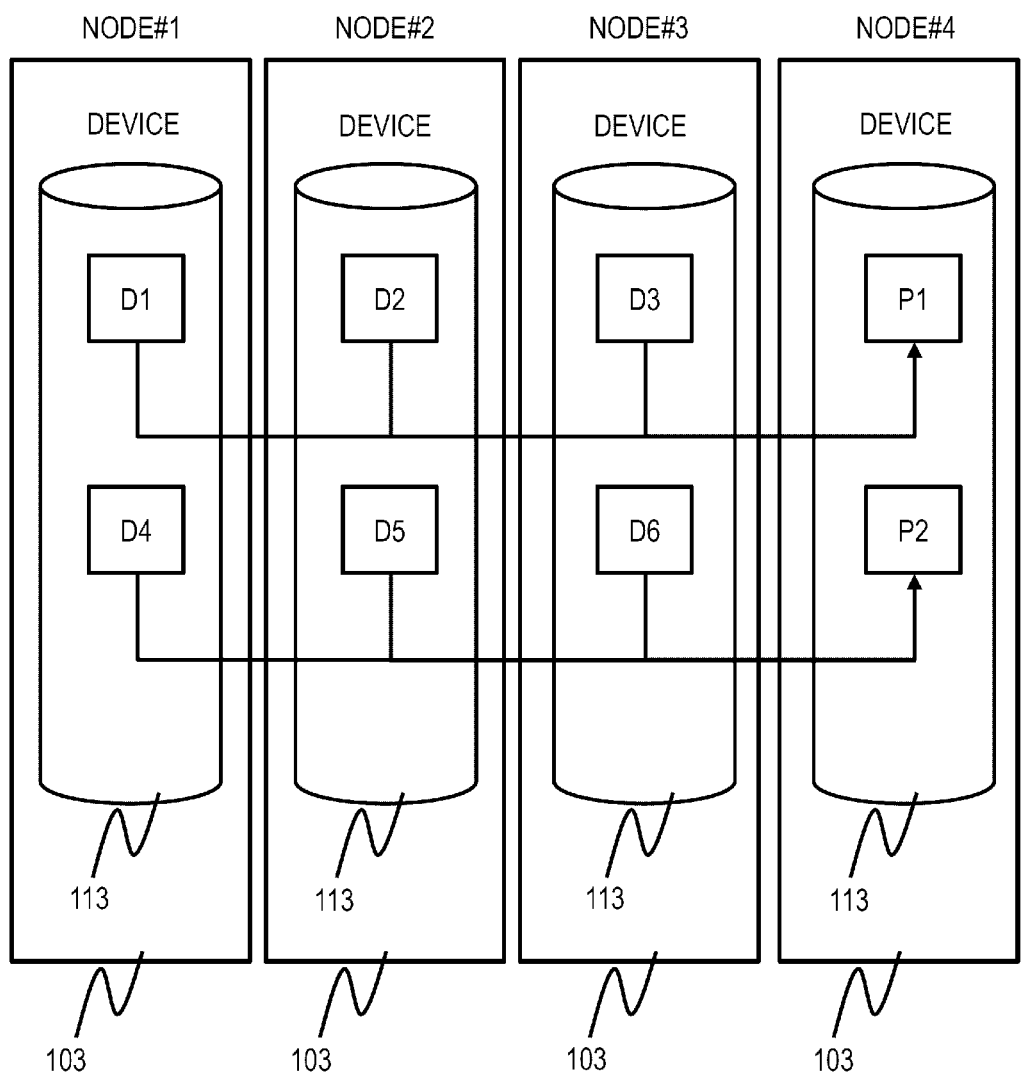
FIG. 10 is a schematic diagram of a distributed Erasure Coding method according to the first embodiment.

FIG. 10 is a schematic diagram of a distributed EC method according to the first embodiment.

The distributed EC is a technique for protecting data between a plurality of nodes 103 using Erasure Coding technique. According to the distributed EC, parity is created from data separately stored in the nodes 103, and the created parity is stored in the node 103 in which the data used for parity creation is not stored, thereby preventing data loss at the time of node failure. For example, when a failure occurs in a certain node 103 and the data stored in the node 103 is unreferable, the parity corresponding to the data and the data used to create the parity are read out from each node 103, and the data that is unreferable can be restored from the parity and the data. For example, in the example of FIG. 10, parity P1 is generated from data D1 of a node #1, data D2 of a node #2, and data D3 of a node #3, and the parity P1 is stored in a node #4. When a failure occurs, for example, in the node #2, the data D2 cannot be read out from the node #2. However, the data D1 from the node #1, the data D3 from the node #3, and the parity P1 from the node #4 can be read, and thus the data D2 can be restored from the data D1, the data D3 and the parity P1. Although various methods have been proposed for the distributed EC, in the present embodiment, for example, the method disclosed in Patent Literature 1 may be used. The distributed EC method is not limited thereto, and a distributed EC method using a Reed-Solomon code or the like may be used.

Next, a node information management table 901 will be described in detail.

FIG. 11 is a configuration diagram of a node information management table according to the first embodiment.

The node information management table 901 is held in each node 103 and stores management information of each node 103 constituting the distributed storage system 1. The node information management table 901 stores an entry corresponding to each node. The entry of the node information management table 901 includes fields of a node number 911, a life-and-death status 912, an owner node LU number 913, a new owner node LU number 914, and an EC node combination 915.

In the node number 911, the number of the node 103 corresponding to the entry is stored. The life-and-death status 912 stores a life-and-death status of the node 103 corresponding to the entry. The life-and-death information includes "Failure" indicating that a failure occurs in the node 103 and the data cannot be referred to, and "Active" indicating that a failure does not occur in the node 103. The owner node LU number 913 stores the number (identifier) of the LU in charge of the node 103 corresponding to the entry (the node 103 corresponding to the entry is the owner node). The new owner node LU number 914 stores the number of the LU in which the node 103 corresponding to the entry is temporarily in charge (the node 103 corresponding to the entry is the new owner node) due to the failure that occurs in other nodes. In the EC node combination 915, a combination of nodes constituting the EC, that is, a combination of a node storing data and a node storing parity is stored. In the present embodiment, the node information management table 901 stored in each node 103 is managed in synchronization using, for example, a protocol such as Paxos. The node information management table 901 may be stored only in a part of the nodes 103, or may be arranged in a device other than the node 103 (for example, the management server 104 or the like).

Next, the node failure processing will be described.

Figure 12:
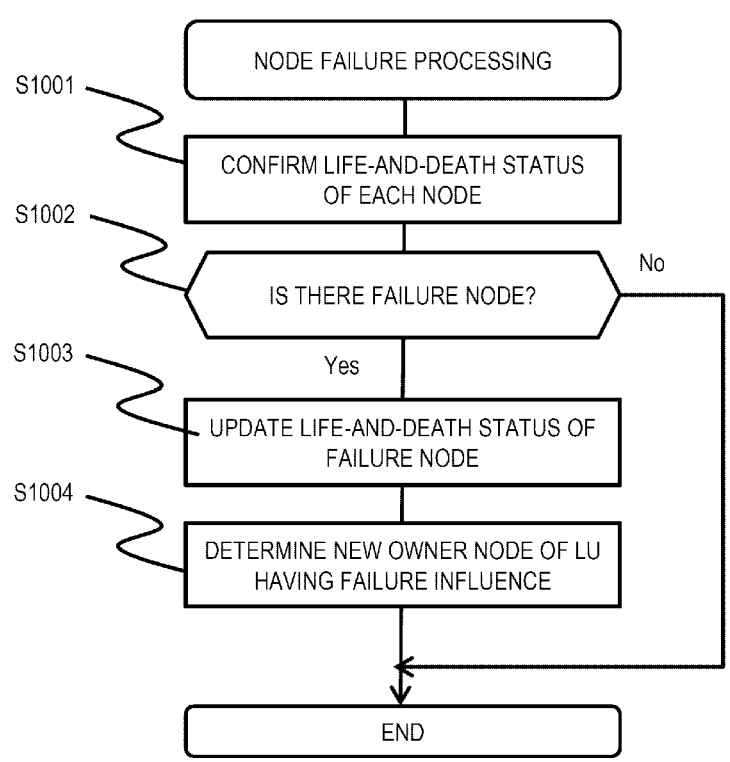
FIG. 12 is a flowchart of node failure processing according to the first embodiment.

FIG. 12 is a flowchart of node failure processing according to the first embodiment.

The node failure processing is realized by the processor 110 that executes a node failure processing program 1000 periodically, for example, in any node (hereinafter referred to as a representative node) 103 among the plurality of nodes 103.

The representative node 103 (specifically, the processor 110 that executes the node failure processing program 1000) confirms the life-and-death status of each node 103 constituting the distributed storage system 1 (S1001). For example, the representative node 103 communicates with each node 103 to confirm the life-and-death status of each node 103.

The representative node 103 determines whether or not there is a node (failure node) in which a failure has occurred (S1002). As a result, when there is no failure node (S1002: No), the representative node 103 ends the processing.

On the other hand, when there is a failure node (S1002: Yes), the representative node 103 updates the life-and-death status 912 of the entry corresponding to the failure node in the node information management table 900 of each node 103 to "Failure" (S1003). Next, the representative node 103 determines a new owner node for each LU in which the failure node is the owner node, updates the new owner node LU number 914 of the entry corresponding to the new owner node of the node information management table 901 of each node (S1004), and ends the processing.

The distributed storage system 1 according to the present embodiment, when a failure occurs in the node 103 and data to be read out is lost, restores data using the table and the program described above and holds the data restored once as the cache data, thereby reducing the amount of data transfer between nodes when access to the data occurs again and preventing a temporary decrease in performance when the network becomes a bottleneck. This will be described in detail below.

Next, the Read processing will be described.

Figure 13:
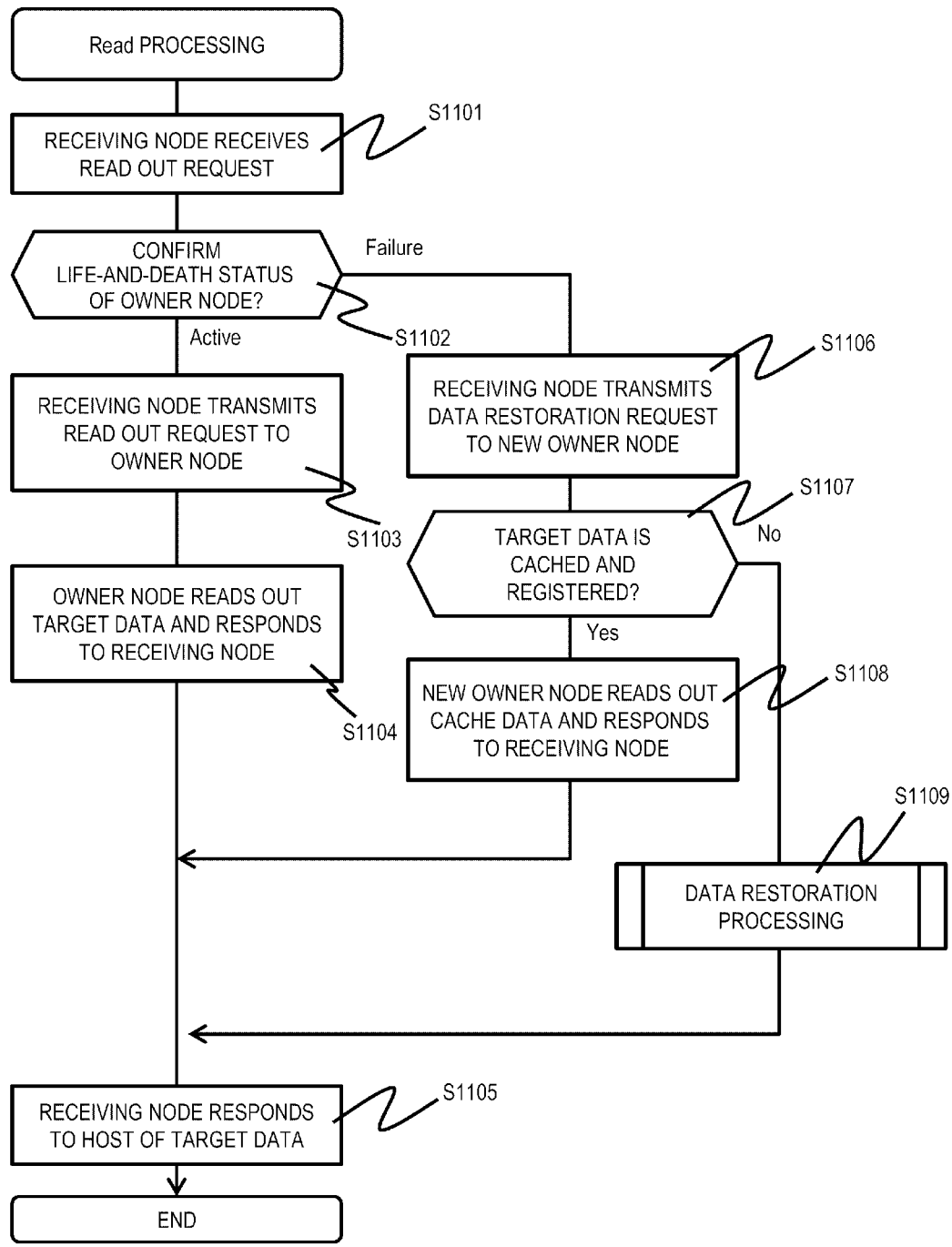
FIG. 13 is a flowchart of Read processing according to the first embodiment.

FIG. 13 is a flowchart of Read processing according to the first embodiment.

The Read processing is realized by the processor 110 of the node 103 that executes a Read program 1100. FIG. 13 is a flowchart including processing executed by executing the Read program 1100 in the plurality of nodes 103 for the sake of convenience.

First, in the nodes 103 constituting the distributed storage system 1, a node to which a read out request (Read request) is transmitted from the host 102 (hereinafter, referred to as a receiving node) receives a data read out request from the host 102 (S1101). Here, the read out request includes an LU of data to be read out, a beginning address of the partial area to be read out, a data length of the data to be read out and the like.

Next, the receiving node refers to the node information management table 901 to confirm the owner node of the LU having the data that is a target for the read out request (read out target data) and a life-and-death status of the owner node (S1102). As a result, when the owner node is active (S1102: Active), the receiving node transmits a request to read out the read out target data (target data read out request: an example of a write request) to the owner node (S1103).

The owner node having received the target data read out request refers to the data page management table 401, identifies a node number, a device number, and an in-device beginning address corresponding to the partial area of the LU included in the target data read out request, reads out data of an area starting from the specified in-device beginning address of the storage device 113 corresponding to the specified node number and the device number, and responds to the receiving node (S1104). Next, the receiving node having received the read out target data responds (transmits) the read out target data to the host 102 that is a read out request source (S1105), and ends the processing.

On the other hand, in step S1102, when the owner node is not active (S1102: Failure), the receiving node refers to the node information management table 901, and transmits a data restoration request (an example of a read request) to a node (new owner node) in charge of restoration processing of the LU including the read out target data (S1106). The new owner node having received the data restoration request refers to its own cache management table 501, and determines whether or not the restoration target data is previously restored and held as cache data (S1107). When the data is held as the cache data (S1107: Yes), the new owner node specifies, from the cache management table 501, the device number in which the cache data is stored, the in-device beginning address, and the in-cache page offset, reads out the restoration target data cached in the area starting from the specified in-device beginning address and the address corresponding to the offset of the storage device 113 corresponding to the specified device number, and responds to the receiving node (S1108). As a result, the receiving node performs the processing of step S1105 using the transmitted restoration target data.

On the other hand, when the cache data is not held in step S1107 (S1107: No), the new owner node executes a data restoration processing (S1109) for restoring the restoration target data, and transmits the restored data to the receiving node.

According to the Read processing described above, when the restoration target data was restored previously and held as cache data, it is possible to quickly transmit the restoration target data to the receiving node without transferring data between other nodes necessary for restoring the restoration target data, that is, without applying a load to the network 106.

Next, the data restoration processing (S1109 in FIG. 13) will be described in detail.

Figure 14:
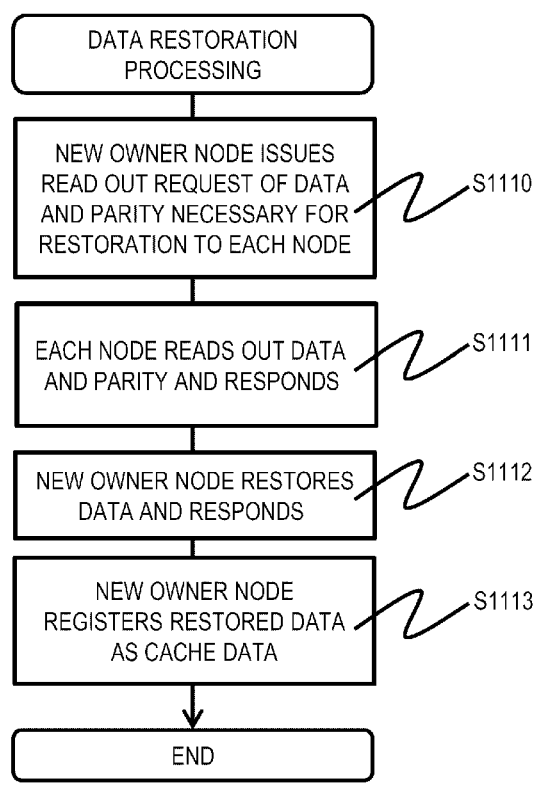
FIG. 14 is a flowchart of data restoration processing according to the first embodiment.

FIG. 14 is a flowchart of data restoration processing according to the first embodiment.

The data restoration processing is realized by the processor 110 of the node 103 that executes a decryption program 1109.

The node 103 (the new owner node in the present embodiment) refers to the node information management table 901, specifies a node number in which data and parity necessary for restoration of the restoration target data are stored, and transmits a data or parity read out request to each node 103 having the specified node number (S1110). Each node 103 having received the read out request reads out the corresponding data or parity from its own storage device 113 and responds (transmits) to the new owner node (S1111). The new owner node restores the restoration target data from the received data and parity using the distributed EC technique and responds to the receiving node (S1112). In this step, for the data part stored in the failure node in the restoration target data, the data part may be restored using the parity and other data, and the data part stored in other nodes may be the data itself obtained from other nodes. Next, the new owner node stores the restoration target data in the node pool 202 as cache data, registers the information of the cache data in its own cache management table 501 (S1113), and ends the processing.

According to the data restoration processing, the new owner node holds the restoration target data obtained by restoration as the cache data. Accordingly, when the restoration target data is requested thereafter, it is possible to quickly transmit the restoration target data to the receiving node without transferring data between other nodes necessary for restoring the restoration target data, that is, without applying a load on the network 106.

Next, write processing will be described.

Figure 15:
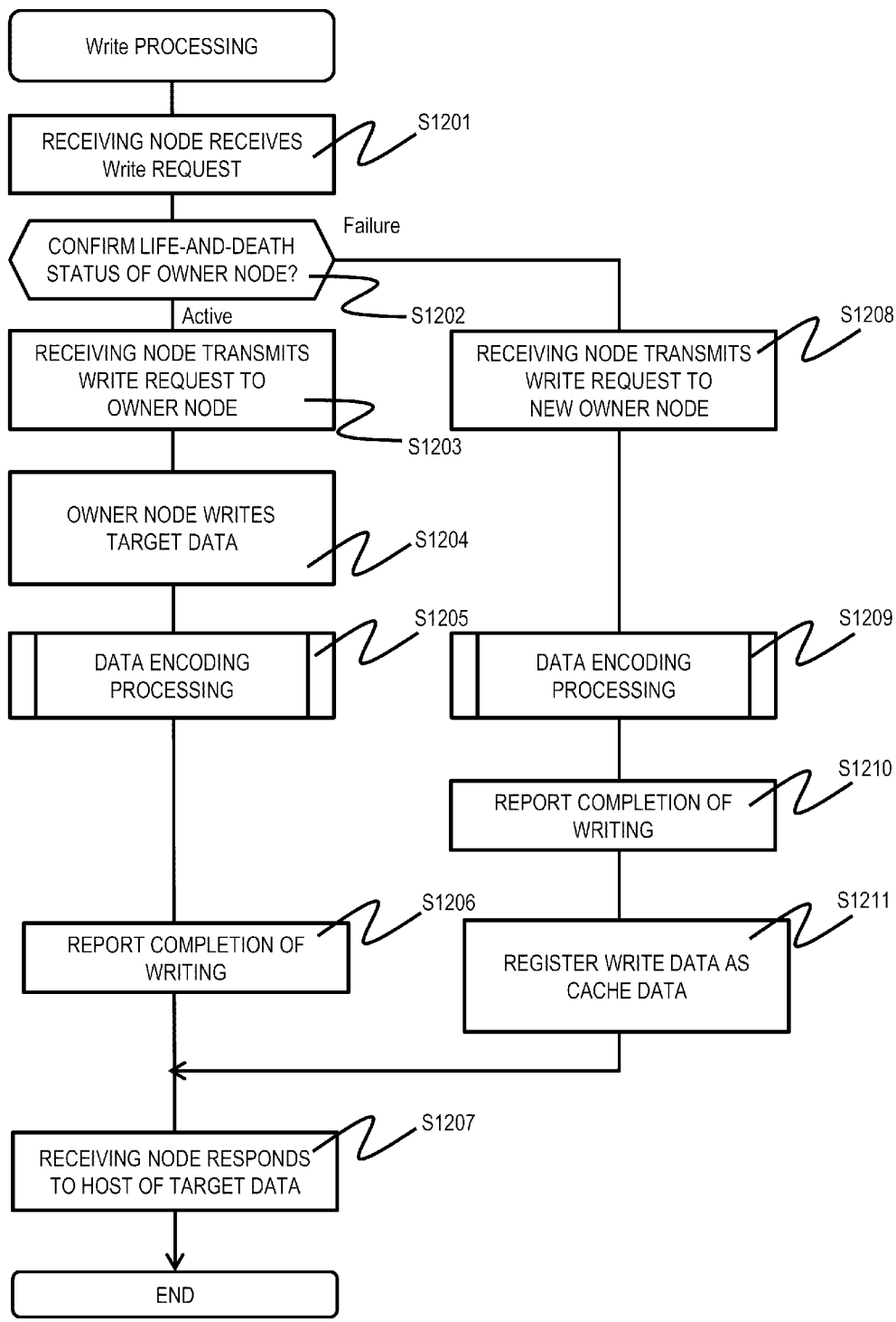
FIG. 15 is a flowchart of Write processing according to the first embodiment.

FIG. 15 is a flowchart of Write processing according to the first embodiment.

The Write processing is realized by the processor 110 of the node 103 that executes a Write program 1200. FIG. 15 is a flowchart including processing executed by executing the Write program 1200 in the plurality of nodes 103 for the sake of convenience.

First, in the nodes 103 constituting the distributed storage system 1, anode (hereinafter referred to as a receiving node) 103 to which a write request (Write request) and write target data are transmitted from the host 102 receives a data write request and write target data from the host 102 (S1201). The receiving node refers to the node information management table 901 to confirm the owner node of the LU that is a write destination and the life-and-death status of the owner node (S1202).

When the owner node is active (S1202: Active), the receiving node transmits the write request and the write target data to the owner node (S1203). The owner node having received the write request confirms whether the data page is associated with the area that is a target of the write request. If not associated, the owner node obtains the data page from its own node pool 202 and writes the write target data to the storage device 113 corresponding to the obtained data page and the area corresponding to the address (S1204).

Next, the owner node executes data encoding processing for performing redundancy of the write target data (S1205).

Next, the owner node reports completion of writing to the receiving node (S1206), the receiving node having received the report of completion of writing from the owner node reports completion of writing to the host 102 (S1207), and the processing ends. Note that, the owner node writes the write target data to its own storage device 113, and then reports the completion of the writing. However, if the data is stored in a nonvolatile memory before writing to the storage device 113 and there is no concern about data loss for the write target data, the completion of writing may be reported before writing to the storage device 113.

In step S1202, when the owner node is not active (S1202: Failure), the receiving node transmits the write request and the write target data to the new owner node (S1208). The new owner node having received the write request performs data encoding processing (S1209: similar to S1205) without writing to its own storage device 113. Next, the new owner node stores the write target data in the node pool 202 as cache data, and registers the cache data in the cache management table 501 (S1211). Accordingly, when a read out request for the current write target data is received thereafter, it is possible to quickly transmit the target data to the receiving node without applying a load to the network 106.

Next, the data encoding processing (S1205 and S1209 in FIG. 15) will be described in detail.

Figure 16:
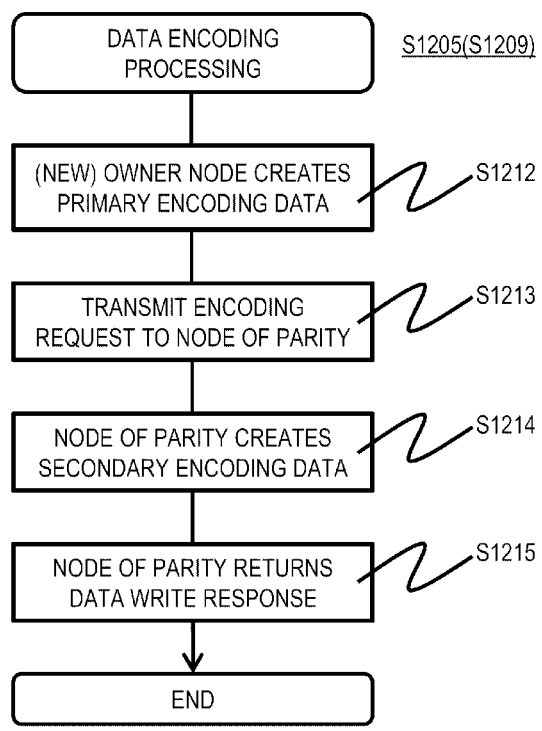
FIG. 16 is a flowchart of data encoding processing according to the first embodiment.

FIG. 16 is a flowchart of data encoding processing according to the first embodiment.

The data encoding processing is realized by the processor 110 of the node 103 that executes the encoding program 1205.

The node 103 (the owner node or the new owner node in the present embodiment) performs a primary encoding on the write target data to generate primary encoding data (S1212). The primary encoding data is generated from pre-update data and post-update data, and can generate secondary encoding data, that is, new parity based on the previous parity.

Next, the owner node transmits write target data and primary encoding data to the node 103 having the node number that stores the parity described in the entry corresponding to the owner node of the LU of the write target data in the node information management table 901 (new owner node if there is a new owner node) (S1213). The node 103 having received the data performs secondary encoding using data transferred similarly from other nodes or the primary encoding data (S1214), writes the secondary encoding data (parity) to its own storage device 113, reports completion of writing to the owner node (S1215), and ends the processing.

Next, rebuild processing for restoring data of an LU stored in a node in which a failure has occurred will be described.

Figure 17:
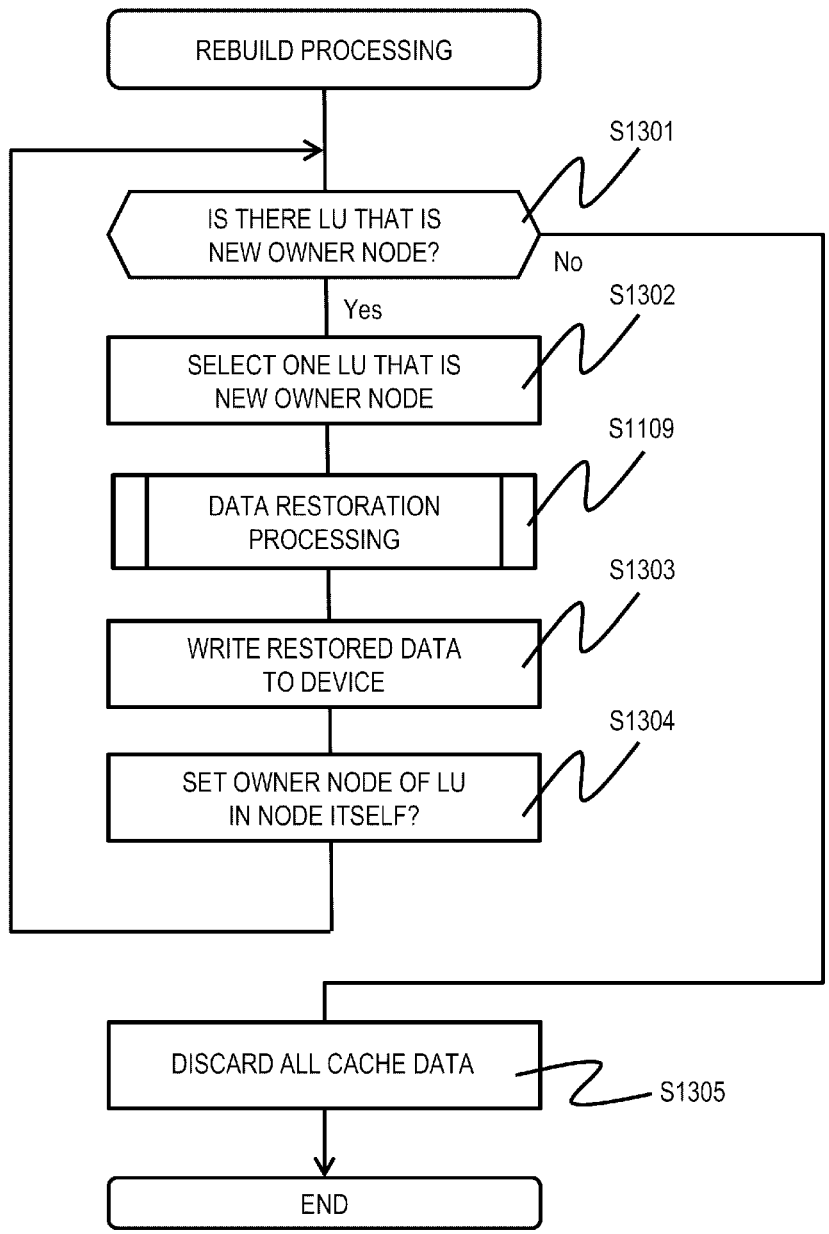
FIG. 17 is a flowchart of rebuild processing according to the first embodiment.

FIG. 17 is a flowchart of rebuild processing according to the first embodiment.

The rebuild processing is realized by the processor 110 of the node 103 that executes the rebuild program 1300. The rebuild processing is executed, for example, when there is a manual instruction from the user or when it is detected that the replacement of the node 103 where a failure has occurred is completed. Further, the rebuild processing may be executed by all the nodes 103 constituting the distributed storage system 1 at the above-mentioned timing.

The node 103 that executes the rebuild program 1300 determines whether or not there is an LU that is the new owner node (S1301). When there is the LU that is the new owner node (S1301: Yes), the node 103 selects one of the LU that is the new owner node as a processing target (S1302), and executes the data restoration processing (S1109) for the LU.

Next, the node 103 stores the data restored by the data restoration processing in its own storage device 113 (S1303). When the restoration of all data stored in the LU is completed, the node 103 updates the owner node related to the LU for which restoration has been completed in the node information management table 901 to itself (S1304), and the processing proceeds to step S1301.

On the other hand, in step S1301, when there is no LU that is the new owner node in the node (S1301: No), all the cache data (for example, cache data of the restored LU) that has become unnecessary in the node pool 202 is discarded, the cache page storing the discarded data is set as a free page (S1305), and the processing is ended.

In the rebuild processing, when there is a read out request for the LU during the processing, it is possible to read out the LU from the cache data cached in the new owner node. Therefore, data can be used without waiting for the rebuild processing.

When the failure node is replaced with another node (a replacement node), the rebuild processing may be performed as follows. That is, first, the replacement node is set to be the new owner node. Specifically, in the node information management table 901, for the LU in which the failure node is the owner node, the replacement node is set as the new owner node. Next, data of a part of the LU to be restored is cached in the node pool 202 of the replacement node. Here, the data to be cached may be only the data cached by the previous new owner node, or may be data having a high access frequency in the LU. Then, a rebuild processing similar to that in FIG. 17 is executed.

Accordingly, the cache data can be used to respond to the read out request for the LU during the processing. After the rebuild processing, the replacement node can be set to the same state as the failure node, that is, the owner node for the LU in which the failure node is the owner node.

As described above, according to the distributed storage system 1 according to the present embodiment, when a failure occurs in any of the nodes 103 and a plurality of read out requests are made to the same data stored in the failure node, data reading from the second time on can be read out without data restoration, and I/O performance can be improved. Although the present embodiment shows an example in which the restoration data is cached in the new owner node, the restoration data may be cached in another node (for example, the receiving node).

Second Embodiment

Next, a distributed storage system according to a second embodiment will be described.

The distributed storage system according to the second embodiment is a system capable of improving the I/O performance by holding cache data of data in an owner node when a free page of the node pool 202 is insufficient and write data needs to be stored in the node pool 202 of another node.

The distributed storage system according to the present embodiment further stores a data rearrangement program in the memory 111. Further, processing content of a Read program and a Write program are changed.

Figure 18:
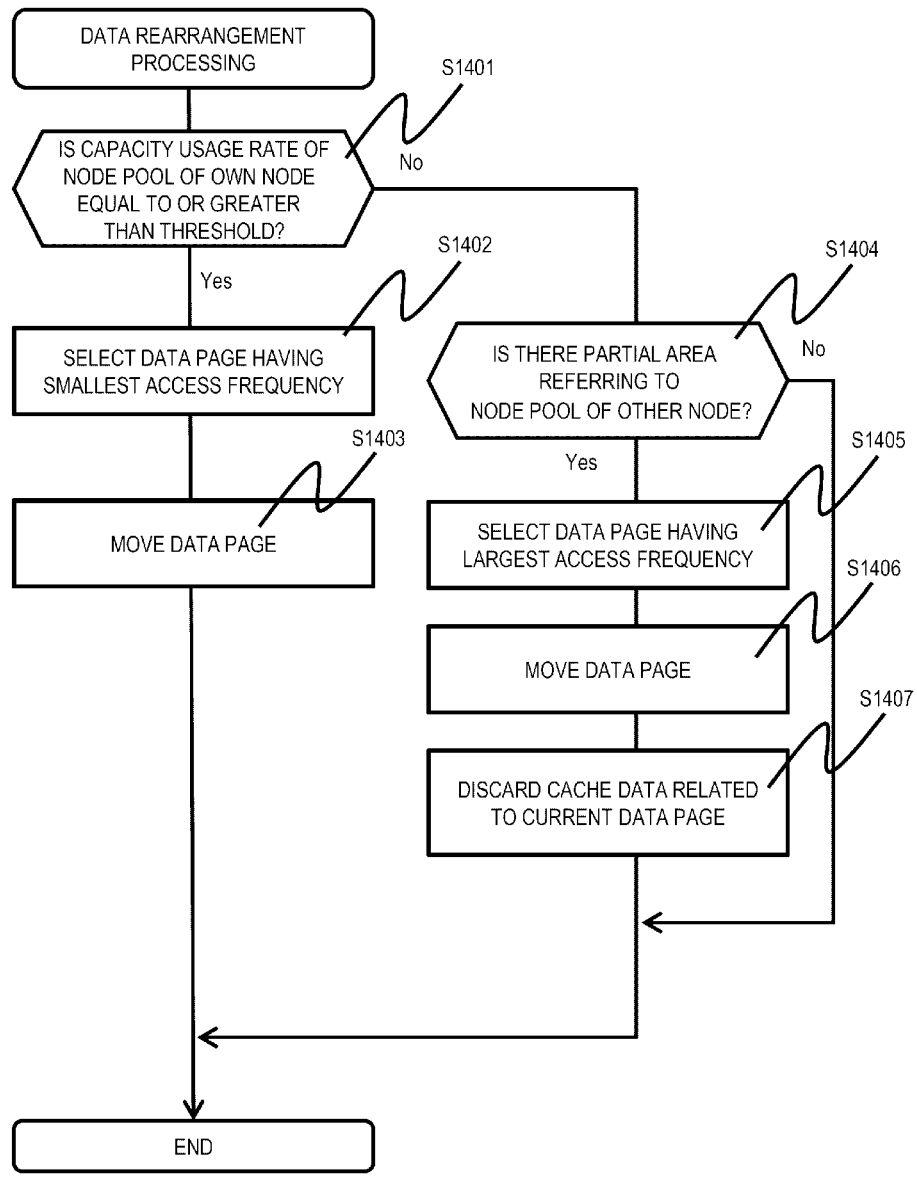
FIG. 18 is a flowchart of data rearrangement processing according to a second embodiment.

FIG. 18 is a flowchart of data rearrangement processing according to the second embodiment.

The data rearrangement processing is realized by the processor 110 of the node 103 that executes a data rearrangement program. The data rearrangement processing is executed, for example, periodically by each node 103.

The node 103 monitors the number of free pages in the node pool 202 of its own node, and confirms whether or not a capacity usage rate of the node pool is equal to or greater than a predetermined threshold (S1401). As a result, when the capacity usage rate is equal to or greater than the threshold (S1401: Yes), the node 103 refers to the performance monitor management table 601, selects a partial area having a smallest access frequency (IOPS) from each partial area of an LU where the own node is an owner node (S1402), moves the selected partial area to a data page of the node pool 202 of another node 103 (S1403), and ends the processing.

On the other hand, when the capacity usage rate is lower than the threshold (S1401: No), the node 103 refers to the data page management table 401, and determines whether or not a partial area that refers to the data page of the node pool 202 of another node 103 exists in the partial area of the LU where the own node is the owner node (S1404). As a result, when the partial area that refers to the data page of the node pool 202 of another node 103 exists (S1404: Yes), the node 103 refers to the performance monitor management table 601, selects a partial area having a largest access frequency in the partial areas (S1405), and moves data of the data page of the selected partial area to the data page of the node pool 202 of itself (own node 103) (S1406). After that, the node 103 refers to the cache management table 501, discards the cache data related to the partial area selected in S1405 from the node pool 202 (S1407), and ends the processing.

On the other hand, when the partial area that refers to the data page of the node pool 202 of another node does not exist (S1404: No), the node 103 ends the processing.

According to the data rearrangement processing described above, if there is a margin in the capacity of the node pool 202 of the own node, the data of the partial area of the LU which is the owner node is stored in the own node, and if there is no margin in the capacity, the data can be stored in another node, and the capacity available for cache can be appropriately ensured in the node pool 202.

Next, Read processing will be described.

Figure 19:
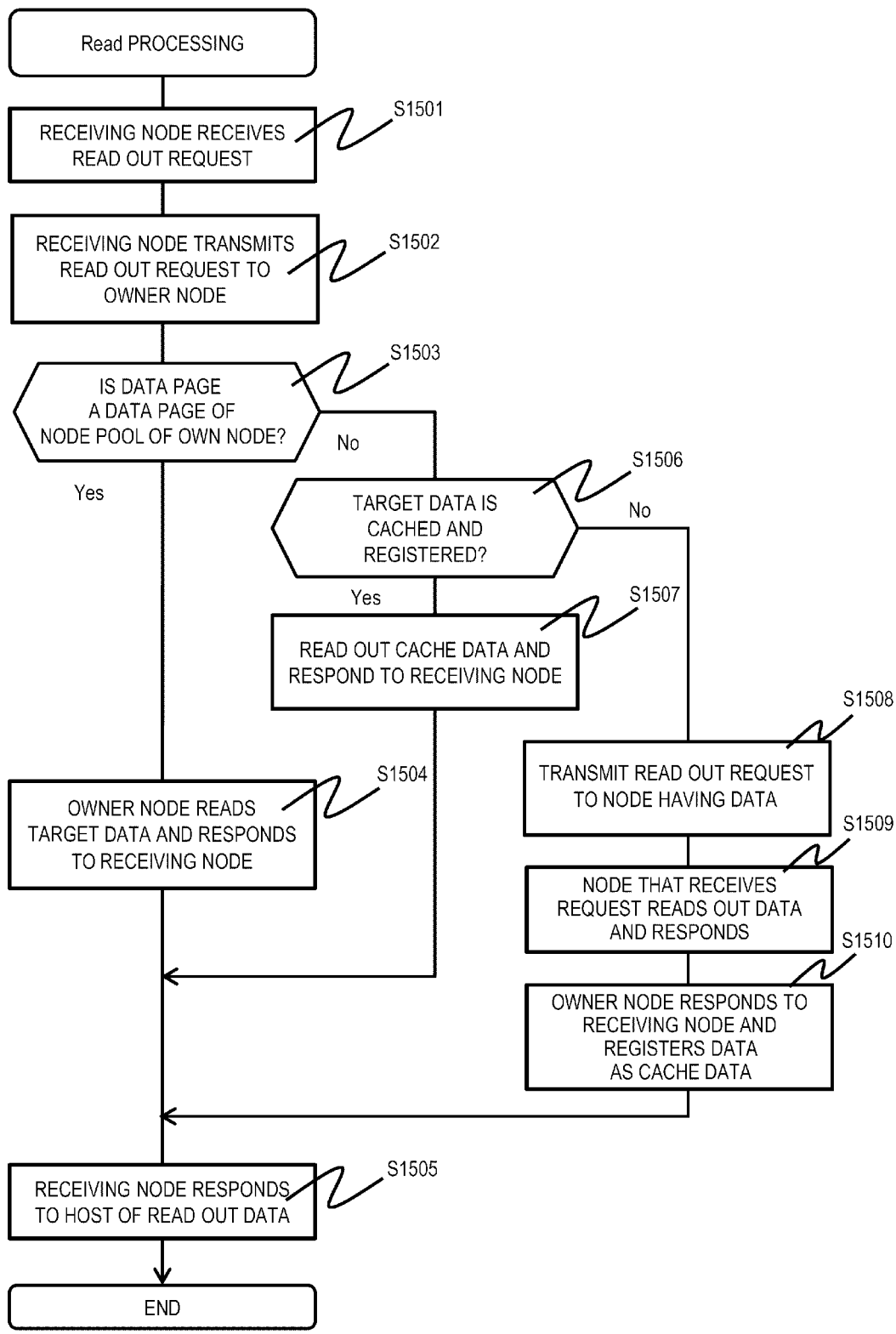
FIG. 19 is a flowchart of Read processing according to the second embodiment.

FIG. 19 is a flowchart of Read processing according to the second embodiment.

The Read processing is realized by the processor 110 of the node 103 that executes a Read program. FIG. 19 is a flowchart including processing realized by executing the Read program in a plurality of nodes 103 for the sake of convenience.

First, in the nodes 103 constituting the distributed storage system 1, a node to which a read out request (Read request) is transmitted from the host 102 (hereinafter, referred to as a receiving node) receives a data read out request from the host 102 (S1501). The receiving node refers to the node information management table 901, specifies an owner node of an LU including read out target data (hereinafter referred to as target data in the description of the present processing), and transmits the read out request to the owner node (S1502).

The owner node having received the read out request refers to the data page management table 401, and determines whether or not a data page in which target data is stored is a data page of the node pool 202 of the own node 103 (S1503).

As a result, when the target data is the data page of the node pool 202 of the own node 103 (S1503: Yes), the owner node reads out the target data from an address corresponding to the data page and responds to the receiving node (S1504). The receiving node having received the response including the read out target data responds to the host 102 (S1505), and ends the processing.

On the other hand, when the target data is not the data page of the node pool 202 of the own node (S1503: No), the owner node refers to the cache management table 601 and determines whether or not the target data is cached (S1506).

As a result, when the cache data exists (S1506: Yes), the owner node reads out the cache data and responds to the receiving node (S1507).

On the other hand, when the cache data does not exist (S1506: No), the owner node issues a read out request to the node 103 that stores the target data (S1508). The node 103 having received the read out request reads out the target data and responds to the owner node (S1509). The owner node having received the response sends a response including the target data to the receiving node, and registers the target data as cache data in itself (S1510). In this manner, when data of an LU that is an owner node itself is in another node 103 and there is a read out request, the data is registered as cache data. Therefore, the same data can be provided thereafter without reading out from other nodes 103, and the target data can be quickly transmitted to the receiving node without applying a load to the network 106.

Next, write processing will be described.

Figure 20:
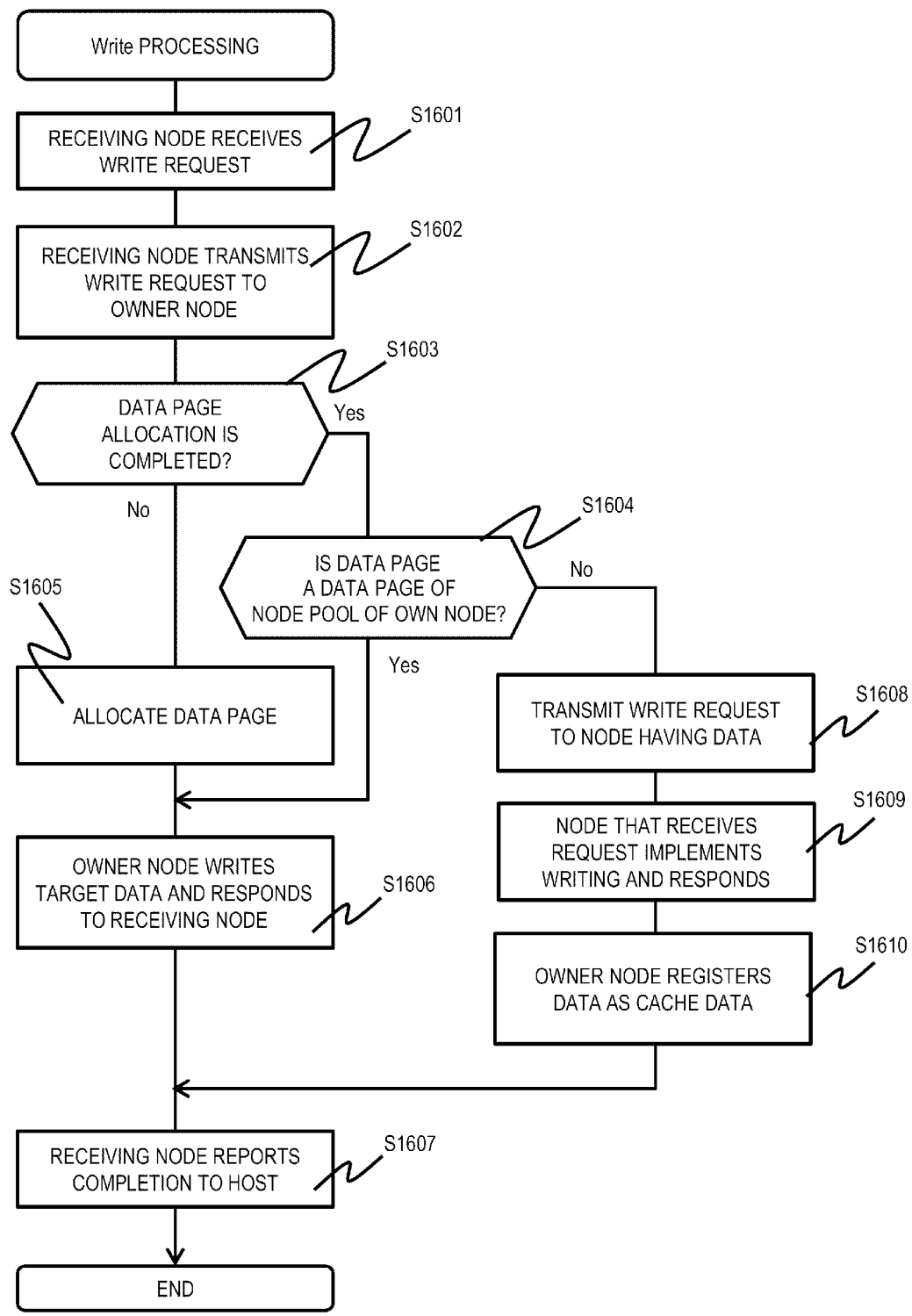
FIG. 20 is a flowchart of Write processing according to the second embodiment.

FIG. 20 is a flowchart of Write processing according to the second embodiment.

The Write processing is realized by the processor 110 of the node 103 that executes a Write program. FIG. 20 is a flowchart including processing executed by executing the Write program in the plurality of nodes 103 for the sake of convenience.

First, in the nodes 103 constituting the distributed storage system 1, a node to which a write request (Write request) and write target data are transmitted from the host 102 (hereinafter referred to as a receiving node) receives a data write request and write target data (referred to as target data in the description of the present processing) from the host 102 (S1601). The receiving node refers to the node information management table 901, specifies an owner node for an LU that is a target of the write request, and issues (transmits) the write request and the target data to the owner node (S1602).

The owner node having received the write request refers to the data page management table 401, and determines whether or not a data page has already been allocated to a write target partial area (S1603). As a result, when the data page is not allocated to the write target partial area (S1603: No), the owner node allocates a data page to the partial area (S1605), writes the target data to the allocated data page, and responds to the receiving node of a completion report (S1606).

On the other hand, when the data page is allocated to the write target partial area (S1603: Yes), the owner node confirms whether or not the data page is the data page of its own node pool 202 (S1604). As a result, when the data page is the data page of its own node pool 202 (S1604: Yes), the processing proceeds to step S1606.

On the other hand, when the data page is not the data page of its own node pool 202 (S1604: No), the owner node issues a write request to a certain node 103 of the data page (S1608).

The node having received the write request writes the target data to the corresponding data page, and responds to the owner node of a completion report (S1609). The owner node having received the completion report responds to the receiving node of a completion report, caches the target data in its own node pool 202, and registers information related to the target data cache in the cache management table 501 (S1610).

The receiving node having received the response of the completion report in S1606 or S1610 reports the completion to the host 102 (S1607).

Third Embodiment

Next, a distributed storage system according to a third embodiment will be described.

In the distributed storage system according to the third embodiment, when an LU is migrated between the nodes 103, the I/O performance is improved by caching data related to the I/O of the LU that occurs during the migration. In the migration of the LU, an owner node of the LU can be changed. However, after the migration of the LU is started, the owner node of the LU is switched to the new node 103. Accordingly, the I/O until the migration of the LU is completed becomes a read remote since data of the entire area of the LU is not prepared in the new node 103. On the other hand, in the present embodiment, the data of the LU to be migrated is cached, and accordingly the performance of the access can be improved. For example, it is effective to perform load distribution between a plurality of nodes 103.

The distributed storage system according to the present embodiment further stores an LU migration management table 1701 and an LU migration program 1800 in the memory 111. Further, processing content of a Read program and a Write program are changed.

Next, the LU migration management table 1701 will be described.

FIG. 21 is a configuration diagram of an LU migration management table according to the third embodiment.

The LU migration management table 1701 is a table for managing configuration information related to LU migration during execution. The LU migration management table 1701 stores an entry for each LU migration. The entry of the LU migration management table 1701 includes fields of a migration source LU 1711, a migration destination LU 1712, and a migration completion address 1713.

The migration source LU 1711 stores a number of an LU that is a migration source (movement source) of the migration corresponding to the entry. The migration destination LU 1712 stores a number of an LU that is a migration destination (movement destination) of the migration corresponding to the entry. The migration completion address 1713 stores an address of an area in which migration is completed.

Next, the LU migration processing will be described.

Figure 22:
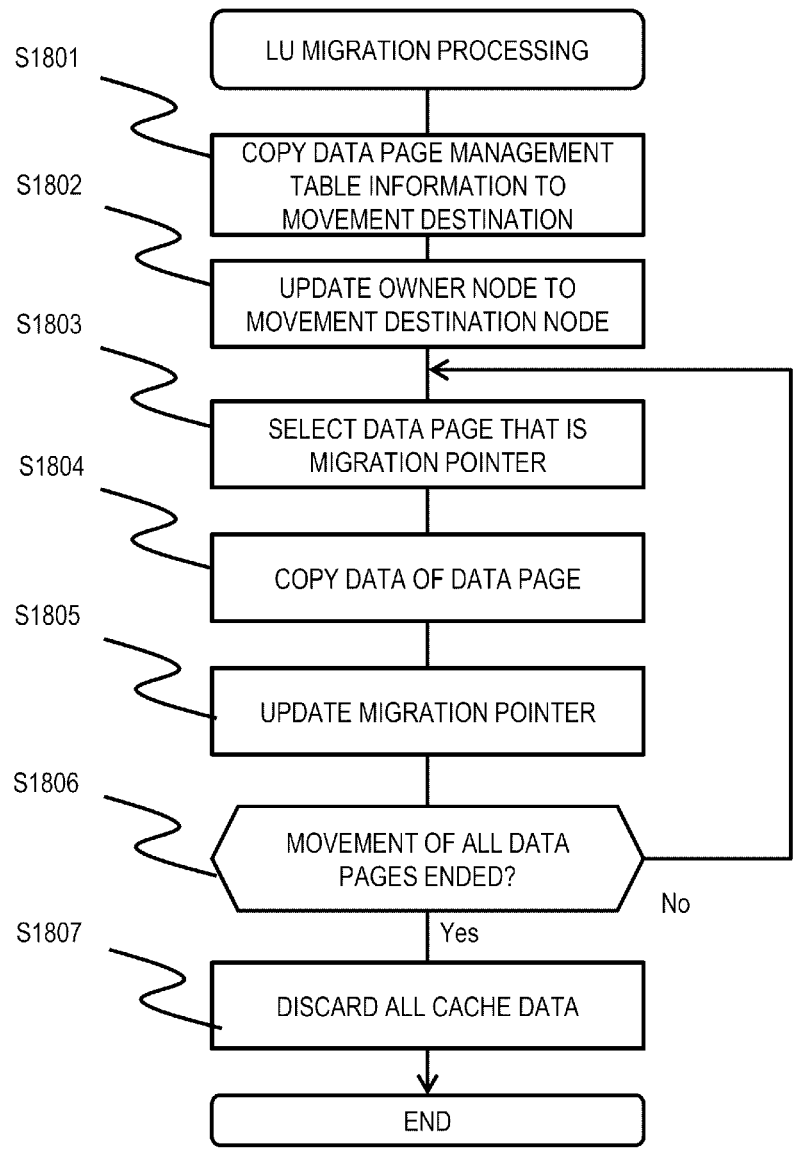
FIG. 22 is a flowchart of LU migration processing according to the third embodiment.

FIG. 22 is a flowchart of the LU migration processing according to the third embodiment.

The LU migration processing is executed by an instruction from the management server 104 or a predetermined trigger. The node 103 that executes the LU migration program copies storage information of the data page management table 401 related to the LU (the movement LU) that is the migration source (the movement source) of the LU migration to the node (the movement destination node: the transfer destination node) that is the migration destination (the movement destination) (S1801), and changes the owner node of the migration source LU in the node information management table 901 from the transfer source node to the movement destination node (S1802).

Next, the node 103 selects a data page of a next address that is a migration completion address (a migration pointer) associated with the LU (S1803), and copies data of the selected data page of the node pool 202 of the migration source node to the data page of the node pool 202 of the migration destination node (S1804). Next, the node 103 updates the migration completion address 1713 to the address of the copied data page (S1805).

Next, the node 103 determines whether or not the movement of all data pages of the migration target LU has ended (S1806). When the movement of all data pages of the LU is not ended (S1806: No), the processing proceeds to step S1803.

On the other hand, when the movement of all data pages of the LU is ended (S1806: Yes), the movement destination node refers to the cache management table 501 of the movement destination node, discards the cache data related to the LU from the node pool 202 (S1807), and ends the processing.

Next, Read processing will be described.

Figure 23:
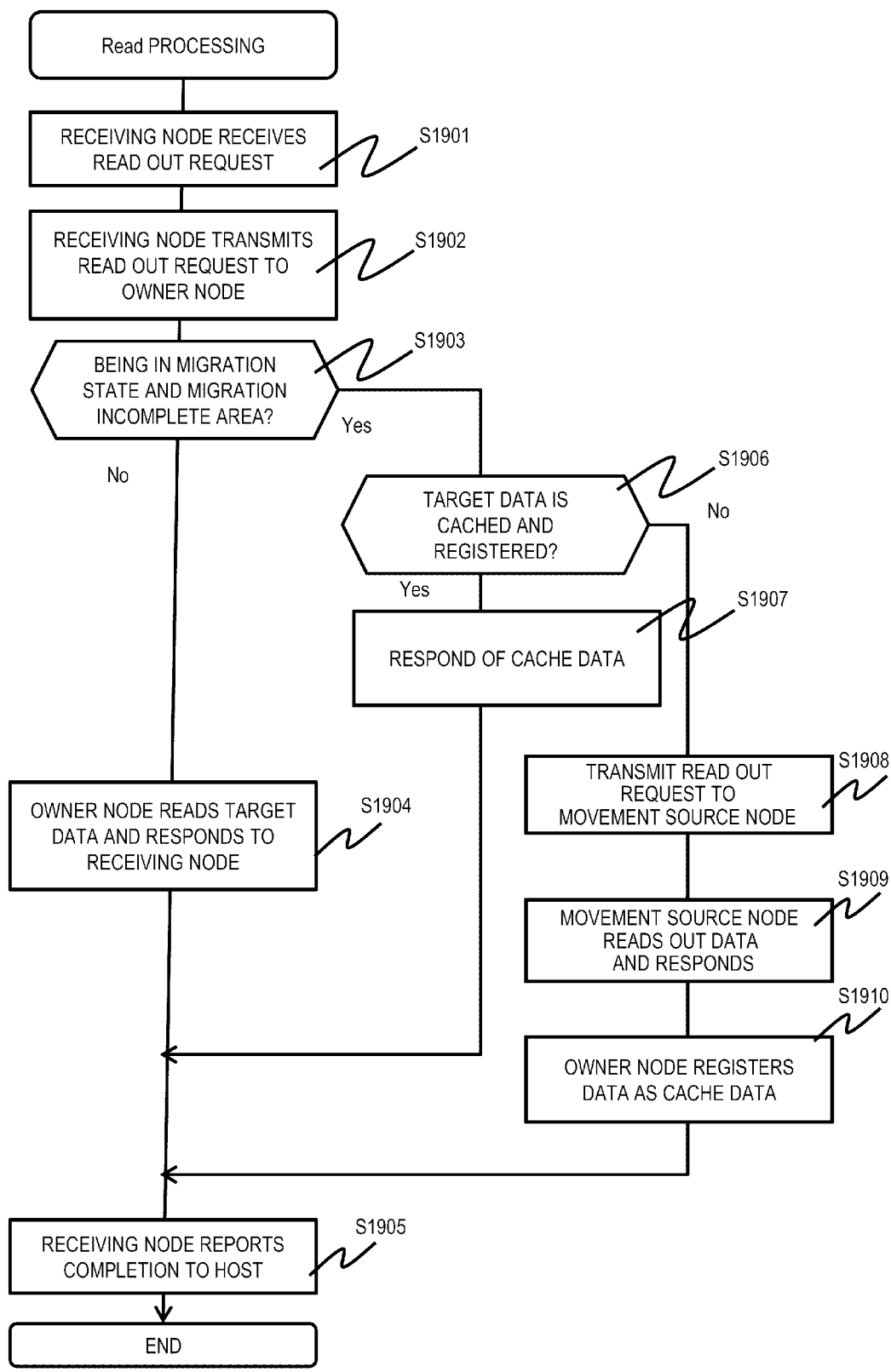
FIG. 23 is a flowchart of Read processing according to the third embodiment.

FIG. 23 is a flowchart of Read processing according to the third embodiment.

The Read processing is realized by the processor 110 of the node 103 that executes a Read program. FIG. 23 is a flowchart including processing realized by executing the Read program in a plurality of nodes 103 for the sake of convenience.

First, in the nodes 103 constituting the distributed storage system 1, a node to which a read out request (Read request) is transmitted from the host 102 (hereinafter referred to as a receiving node) receives a data read out request from the host 102 (S1901). The receiving node refers to the node information management table 901, specifies an owner node of an LU including read out target data (hereinafter referred to as target data in the description of the present processing), and transmits the read out request to the owner node (S1902).

The owner node having received the read out request refers to the LU migration management table 1800, and determines whether or not the LU including the target data is in a migration state and whether or not the target data is data in an area for which migration is not completed (S1903).

As a result, when the LU including the target data is not in the migration state, or when the LU is in the migration state but the target data is data of an area where migration has been completed (S1903: No), the owner node reads out the target data from an address corresponding to the data page and responds to the receiving node (S1904). The receiving node having received the response including the readout target data responds to the host 102 (S1905), and ends the processing.

On the other hand, when the LU including the target data is in the migration state and the target data is data of an area where the migration has not been completed (S1903: Yes), the owner node refers to the cache management table 601 and determines whether or not the target data is cached (S1906).

As a result, when the cache data exists (S1906: Yes), the owner node reads out the cache data and responds to the receiving node (S1907).

On the other hand, when the cache data does not exist (S1906: No), the owner issues a readout request to the movement source node (S1908). The movement source node 103 having received the read out request reads out the target data and responds to the owner node (S1909). The owner node having received the response sends a response including the target data to the receiving node, and registers the target data as cache data in itself (stores cache data in the node pool 202 and registers in the cache management table 501) (S1910).

As described above, when migration is not completed for data of an LU that is an owner node itself and there is a read out request, the data is registered as cache data. Accordingly, the same data will be provided thereafter without applying a load to the network 106 and the target data can be quickly transmitted to the receiving node without reading out from other nodes 103.

Next, write processing will be described.

Figure 24:
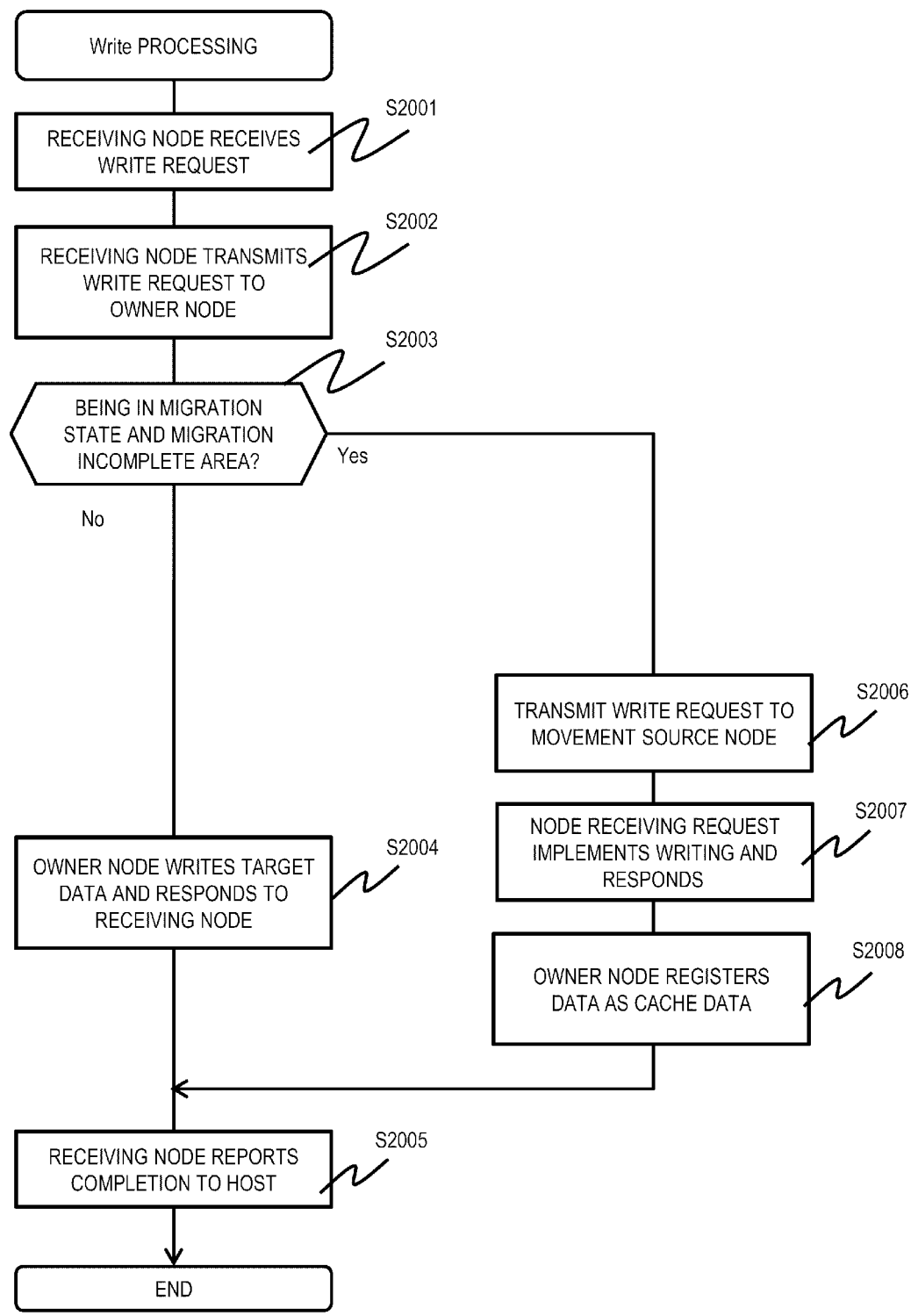
FIG. 24 is a flowchart of Write processing according to the third embodiment.

FIG. 24 is a flowchart of Write processing according to the third embodiment.

The Write processing is realized by the processor 110 of the node 103 that executes a Write program. FIG. 24 is a flowchart including processing executed by executing the Write program in the plurality of nodes 103 for the sake of convenience.

First, in the nodes constituting the distributed storage system 1, a node to which a write request (Write request) and write target data are transmitted from the host 102 (hereinafter referred to as a receiving node) receives a data write request and write target data (referred to as target data in the description of the present processing) from the host 102 (S2001). The receiving node refers to the node information management table 901, specifies an owner node for an LU that is a target of the write request, and issues (transmits) the write request and the target data to the owner node (S2002).

The owner node having received the write request and the target data refers to the LU migration management table 1701, and determines whether or not the LU storing the target data is in the migration state and whether or not the target data is data of an area for which migration is not completed (S2003).

As a result, when the LU storing the target data is not in the migration state, or when the LU is in the migration state but the target data is data of an area in which the migration has been completed (S2003: No), the owner node writes the target data in an area of an address corresponding to the data page of its own node pool 202, and responds to the receiving node of the write request (S2004). The receiving node having received the response of the write request sends a completion report to the host 102 (S2005), and ends the processing.

On the other hand, when the LU including the target data is in the migration state and the target data is data of an area in which migration has not been completed (S2003: Yes), the owner node issues a write request to the movement source node (S2006). The movement source node 103 having received the write request writes the target data and responds to the owner node (S2007). The owner node having received the response sends a completion report to the receiving node, and registers the target data as cache data in itself (stores cache data in the node pool 202 and registers in the cache management table 501) (S2008).

As described above, when migration is not completed for data of an LU that is an owner node itself and there is a write request, the data is registered as cache data. Accordingly, when there is a read out request for the same data thereafter, it is not necessary to perform reading out from other nodes 103, and it is possible to quickly transmit the target data to the receiving node without applying a load to the network 106.

Fourth Embodiment

A distributed storage system according to a fourth embodiment is an extension of the distributed storage system according to the third embodiment. In the present embodiment, a data group having high access frequency among data groups owned by a certain node 103 is stored as cache data in another node 103 in advance. In this manner, when the performance load of a specific node 103 is high and it is necessary to migrate data, the amount of data transfer between the nodes 103 when access is concentrated on specific data can be reduced even if the migration has just started, and a temporary decrease in performance due to the network becoming the bottleneck can be prevented.

The distributed storage system according to the present embodiment further stores a cache warming program 2100 in the memory 111.

Figure 25:
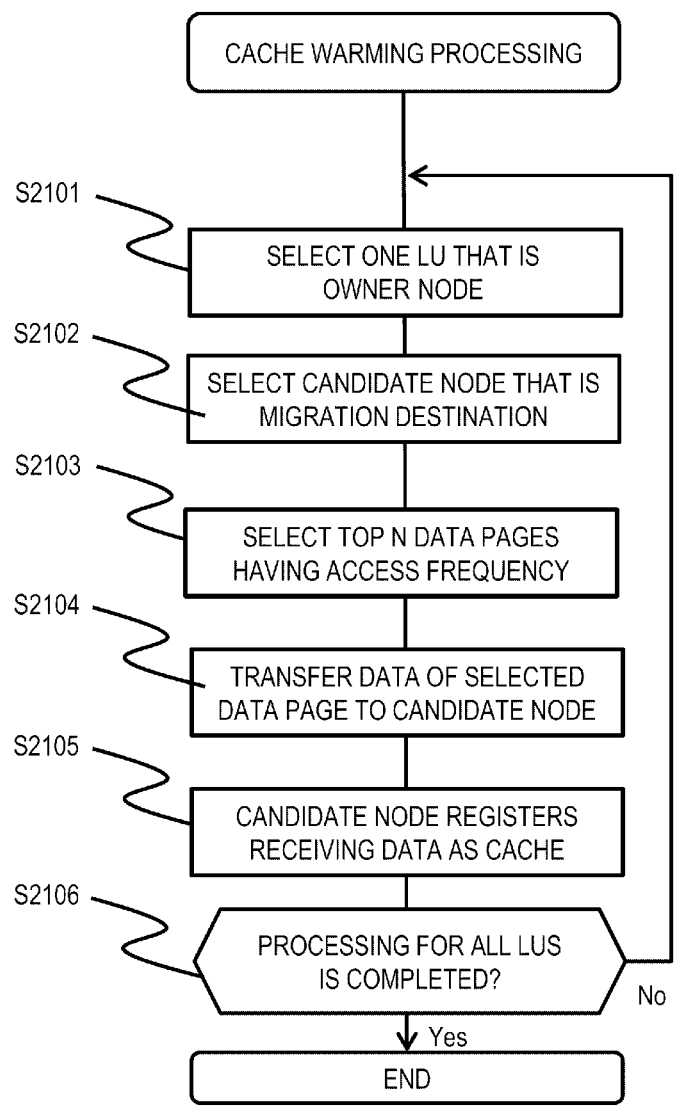
FIG. 25 is a flowchart of cache warming processing according to a fourth embodiment.

FIG. 25 is a flowchart of cache warming processing according to the fourth embodiment.

The cache warming processing is realized by the processor 110 of the node 103 that executes the cache warming program 2100. FIG. 25 is a flowchart including processing realized by executing the cache warming program 2100 in the plurality of nodes 103 for the sake of convenience. The cache warming processing is executed, for example, periodically in each node 103.

First, the node 103 that executes the cache warming program 2100 selects one LU (target LU) from LUs that are owner nodes (S2101), and selects a candidate node to be a migration destination of the LU when the migration is executed at a high load or the like (S2102).

Next, the node 103 refers to the performance monitor management table 601 for the target LU, and selects top N (N is an arbitrary integer) data pages having the access frequency (IOPS) in the target LU (S2103). Next, the node 103 transfers data of the selected data page group to the candidate node, and requests the data be registered as cache data (S2104). The candidate node registers the received data in itself as cache data (S2105). Specifically, the candidate node caches the data received in the node pool 202, and registers information related to the cache of the data in the cache management table 501.

Next, the node 103 determines whether or not the processing has been completed for all LUs that are owner nodes themselves (S2106). When the processing is not completed for all the LUs that are owner nodes themselves (S2106: No), the processing moves to step S2101. On the other hand, when the processing is completed for all the LUs that are owner nodes themselves (S2106: Yes), the processing is ended.

The invention is not limited to the above embodiments, and can be appropriately modified and implemented without departing from the spirit of the invention.

For example, two or more of the embodiments described above may be combined.

Further, each of the configurations, functions, and the like described above may be partially or entirely realized by hardware through design using an integrated circuit or the like. Information such as a program, a table, and a file for realizing each function may be stored in a storage device such as a nonvolatile semiconductor memory, an HDD, or an SSD, or a computer-readable non-transitory data storage medium such as an IC card, an SD card, or a DVD.

What is claimed is:

1. A distributed storage system that manages data distributed to a plurality of storage devices, the distributed storage system comprising:
   a plurality of storage apparatuses; and
   an in-charge storage apparatus, wherein
   each of the plurality of storage apparatuses includes a processor unit,
   each of the plurality of storage devices includes a data area used to store data, and a cache area used to cache data,
   the in-charge storage apparatus is in charge of an access to each logical unit that manages data, the in-charge storage apparatus is a storage apparatus that
becomes the in-charge storage apparatus in a non-
storage state where data of the logical unit is not stored
in the data area of the storage device that is accessible
to itself when receiving a transfer of charge of the
logical unit from another storage apparatus, and
a processor unit of the in-charge storage apparatus is
configured to:
receive a read request for a logical unit that is in charge
itself;
obtain data of a target area of the logical unit in the
non-storage state based on data of the storage device
of another storage apparatus; and
transmit the obtained data of the target area of the
logical unit to a request source of the read request,
and store the obtained data of the target area of the
logical unit to a cache area of the storage device that
is accessible to itself, wherein
the data of the logical unit is redundantly managed by a
plurality of storage apparatuses constituting Erasure
Coding (EC),
the in-charge storage apparatus is configured to newly
take charge of a logical unit that was in the charge of
a failure storage apparatus since a failure occurred in a
storage apparatus constituting the EC, the failure stor-
age apparatus being the storage apparatus in which the
failure occurred,
the processor unit of the in-charge storage apparatus is
configured to:
receive a read request for a logical unit that is newly in
charge,
obtain data for restoring data of a target area from a
plurality of storage apparatuses constituting the EC
other than the failure storage apparatus when the data
of the target area of the logical unit which is a target
of the read request is stored in a data area of a storage
device of the failure storage apparatus but not stored
in a data area or a cache area of the storage device
that is accessible to the in-charge storage apparatus,
restore the data of the target area based on the obtained
data, and
transmit the restored data to a request source of the read
request and store the restored data of the target area
to a cache area of the storage device.

2. The distributed storage system according to claim 1,
wherein
the processor unit of the in-charge storage apparatus is
configured to:
receive a write request for a logical unit that is newly in
charge; and
store data to be written to a target area corresponding to
the write request in the cache area.

3. The distributed storage system according to claim 1,
wherein
after a replacement storage apparatus, which is a storage
apparatus to replace the failure storage apparatus, is
provided,
a processor unit of the replacement storage apparatus is
configured to:
obtain data for restoring data of a part of an area of the
logical unit from a plurality of storage apparatuses
constituting the EC other than the failure storage
apparatus;
restore the data of a part of an area of the logical unit
and store the data to a cache area of the storage
device based on the obtained data;

obtain data for restoring data of an area of the logical
unit from the plurality of storage apparatuses con-
stituting the EC other than the failure storage appa-
ratus;
restore data of all areas of the logical unit and store the
data to a data area of the storage device based on the
obtained data; and
discard data of the cache area corresponding to the
logical unit.

4. The distributed storage system according to claim 1,
wherein
the processor unit of the in-charge storage apparatus is
configured to:
obtain parity and data necessary for restoring data of all
areas of the logical unit from a plurality of storage
apparatuses constituting the EC other than the failure
storage apparatus;
restore the data of all areas of the logical unit and store
the data to the data area of the storage device based
on the parity and the data; and
discard data of the cache area corresponding to the
logical unit.

5. The distributed storage system according to claim 1,
wherein
a processor unit of a transfer destination storage apparatus
to which the charge of the logical unit is transferred
from a transfer source storage apparatus is configured
to:
regarding the logical unit that is a target for the transfer,
take the logical unit being migrated as a target during
migration of data of the logical unit from the transfer
source storage apparatus to a storage device that is
accessible to the transfer destination storage appara-
tus;
read out the data of the target area from the transfer
source storage apparatus when a read request for an
area in which migration of the logical unit is not
completed is received and the data of the target area
of the read request is not stored in the cache area of
the storage device:
transmit the read out data to a request source of the read
request; and
store the read out data to the cache area of the storage
device of the transfer destination storage apparatus.

6. The distributed storage system according to claim 1,
wherein
a processor unit of a transfer destination storage apparatus
to which the charge of the logical unit is transferred
from a transfer source storage apparatus is configured
to:
regarding the logical unit that is a target for the transfer,
take the logical unit being migrated as a target during
migration of data of the logical unit from the transfer
source storage apparatus to a storage device of the
transfer destination storage apparatus;
store write target data of the write request to a data area
of the transfer destination storage apparatus when a
write request for an area in which migration of the
logical unit is not completed is received; and
store the write target data to a cache area of the storage
device of the transfer destination storage apparatus.

7. The distributed storage system according to claim 1,
wherein
a processor unit of a transfer source storage apparatus that
transfers the charge of the logical unit is configured to:
select a transfer destination storage apparatus that
transfers the charge of the logical unit; and transmit data of a part of an area having a high access frequency in the logical unit that is a target of the transfer to the transfer destination storage apparatus; and a processor unit of the transfer destination storage apparatus is configured to:
store the data of the part of the area having a high access frequency in the logical unit that is a target of the transfer, which is transmitted from the transfer source storage apparatus, in a cache area of a storage device of the transfer destination storage apparatus.

8. The distributed storage system according to claim 1, wherein
the processor unit of the storage apparatus is configured to, when a capacity usage rate in the storage device is equal to or greater than a predetermined value, move data in a part of a data area of a logical unit in the charge of its own storage apparatus to a data area of a storage device of another storage apparatus.

9. The distributed storage system according to claim 8, wherein
when a capacity usage rate in a storage device of the own storage apparatus is less than a predetermined value, the processor unit of the storage apparatus is configured to:
move data moved to the data area of the storage device of another storage apparatus, which is a logical unit in the charge of its own storage apparatus, to the data area of the storage device of the own storage apparatus; and
discard data corresponding to the data of the moved logical unit in the cache area of the storage device of the own storage apparatus.

10. The distributed storage system according to claim 1, wherein
the processor unit of the storage apparatus is configured to:
select whether to replace data in an existing cache area or to ensure a new cache area based on a cache hit rate of the logical unit when storing the data of the logical unit in the cache are; and
store the data of the logical unit in the cache area corresponding to the selected result.

11. The distributed storage system according to claim 1, wherein
the processor unit of the storage apparatus is configured to:
generate a free area by moving the data of the data area of the storage device to a data area of a storage device of another storage apparatus when there is no free area which is allocated as the cache area in the storage device when storing the data of the logical unit in the cache area; and
allocate the free area to the cache area.

12. A data management method in a distributed storage system that includes a plurality of storage apparatuses as well as an in-charge storage apparatus and manages data distributed to a plurality of storage devices, wherein
each of the plurality of storage devices includes a data area used to store data, and a cache area used to cache data,
the in-charge storage device is in charge of an access to each logical unit that manages data,
the in-charge storage apparatus is a storage apparatus that becomes the in-charge storage apparatus in a non-storage state where data of the logical unit is not stored in the data area of the storage device that is accessible to itself when receiving a transfer of charge of the logical unit from another storage apparatus, and
the in-charge storage apparatus is configured to:
receive a read request for a logical unit that is in charge of itself;
obtain data of a target area of the logical unit in the non-storage state based on data of the storage device of another storage device; and
transmit the obtained data of the target area of the logical unit to a request source of the read request, and store the obtained data of the target area of the logical unit to the cache area of the storage device that is accessible to itself, wherein
the data of the logical unit is redundantly managed by a plurality of storage apparatuses constituting Erasure Coding (EC),
the in-charge storage apparatus is configured to newly take charge of a logical unit that was in the charge of a failure storage apparatus since a failure occurred in a storage apparatus constituting the EC, the failure storage apparatus being the storage apparatus in which the failure occurred,
the processor unit of the in-charge storage apparatus is configured to:
receive a read request for a logical unit that is newly in charge,
obtain data for restoring data of a target area from a plurality of storage apparatuses constituting the EC other than the failure storage apparatus when the data of the target area of the logical unit which is a target of the read request is stored in a data area of a storage device of the failure storage apparatus but not stored in a data area or a cache area of the storage device that is accessible to the in-charge storage apparatus,
restore the data of the target area based on the obtained data, and
transmit the restored data to a request source of the read request and store the restored data of the target area to a cache area of the storage device.

13. A data management program to be executed a computer constituting an in-charge storage apparatus that is in charge of an access to a predetermined logical unit in a distributed storage system that includes a plurality of storage apparatuses and manages data distributed to a plurality of storage devices, wherein
each of the storage devices includes a data area used to store data, and a cache area used to cache data,
the in-charge storage apparatus becomes the in-charge storage apparatus in a non-storage state where data of the logical unit is not stored in the data area of the storage device when receiving a transfer of charge of the logical unit from another storage apparatus, and
the data management program causes the computer to:
receive a read request for a logical unit that is in charge itself;
obtain data of a target area of the logical unit in the non-storage state based on data of the storage device of another storage apparatus; and
transmit the obtained data of the target area of the logical unit to a request source of the read request, and store the obtained data of the target area of the logical unit to the cache area of the storage device that is accessible to itself; wherein
the data of the logical unit is redundantly managed by a plurality of storage apparatuses constituting Erasure Coding (EC), the in-charge storage apparatus is a storage apparatus configured to newly take charge of a logical unit that was in the charge of a failure storage apparatus since a failure occurred in a storage apparatus constituting the EC, the failure storage apparatus being the storage apparatus in which the failure occurred, the processor unit of the in-charge storage apparatus is configured to:

receive a read request for a logical unit that is newly in charge, obtain data for restoring data of a target area from a plurality of storage apparatuses constituting the EC other than the failure storage apparatus when the data of the target area of the logical unit which is a target of the read request is stored in a data area of a storage device of the failure storage apparatus but not stored in a data area or a cache area of the storage device that is accessible to the in-charge storage apparatus, restore the data of the target area based on the obtained data, and transmit the restored data to a request source of the read request and store the restored data of the target area to a cache area of the storage device.

\* \* \* \* \*